US012636886B2

(12) United States Patent
Hayashi

(10) Patent No.: US 12,636,886 B2
(45) Date of Patent: May 26, 2026

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Kakeru Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 204 days.

(21) Appl. No.: 18/417,443

(22) Filed: Jan. 19, 2024

(65) Prior Publication Data

US 2024/0246339 A1 Jul. 25, 2024

(30) Foreign Application Priority Data

Jan. 20, 2023 (JP) ................................ 2023-007230

(51) Int. Cl.
*B41J 2/165* (2006.01)
*B41J 2/175* (2006.01)

(52) U.S. Cl.
CPC ....... *B41J 2/16552* (2013.01); *B41J 2/16505* (2013.01); *B41J 2/16508* (2013.01); *B41J 2/1652* (2013.01); *B41J 2/16523* (2013.01); *B41J 2/17523* (2013.01); *B41J 2/17596* (2013.01); *B41J 2/165* (2013.01)

(58) Field of Classification Search
CPC ................ B41J 2/16552; B41J 2/16505; B41J 2/16508; B41J 2/1652; B41J 2/16523; B41J 2/17523; B41J 2/17596; B41J 2/165; B41J 2/16532
See application file for complete search history.

(56) References Cited

U.S. PATENT DOCUMENTS 11,097,552 B2 * 8/2021 Ozawa .................. B41J 2/1652

FOREIGN PATENT DOCUMENTS

JP 2011161789 A 8/2011

* cited by examiner

*Primary Examiner* — Justin Seo
(74) *Attorney, Agent, or Firm* — HOGAN LOVELLS US LLP

(57) ABSTRACT

A printer includes a first cap closely adhering to a first nozzle surface, a second cap closely adhering to a second nozzle surface, a first pump provided in a first flow path connected to the first cap, a second pump provided in a second flow path connected to the second cap, and a processor. The processor performs supplying a cleaning liquid from a tank to the first cap, by driving the first pump during a first supply period in a state of the first cap being closely adhered to the first nozzle surface, and supplying the cleaning liquid from the tank to the second cap, by driving the second pump during a second supply period in a state of the second cap being closely adhered to the second nozzle surface. The first supply period includes a first specific supply period that does not overlap with the second supply period.

11 Claims, 13 Drawing Sheets

PRINTER, CONTROL METHOD, AND NON-TRANSITORY COMPUTER-READABLE MEDIUM STORING COMPUTER-READABLE INSTRUCTIONS

REFERENCE TO RELATED APPLICATIONS

This application claims priority from Japanese Patent Application No. 2023-007230 filed on Jan. 20, 2023. The entire content of the priority application is incorporated herein by reference.

BACKGROUND ART

A printer is provided with a plurality of print heads, a plurality of caps, a tank, and a plurality of pumps. The plurality of print heads include nozzle surfaces in which nozzles are provided. The caps seal the nozzle surfaces. The tank stores a cleaning liquid. A tube is connected to the tank. After extending from the tank, the tube branches into a plurality of tubes. The plurality of tubes are respectively connected to the caps. The plurality of pumps are provided in correspondence to each of the caps. The printer drives the plurality of pumps in a state in which the caps seal the nozzle surfaces. In this way, the cleaning liquid is supplied from the tank to the inside of each of the caps via the tubes.

SUMMARY

In the above-described printer, when driving periods of each of the pumps match each other, there is a possibility that it may be difficult for each of the pumps to suction the cleaning liquid from the tank. As a result, in the above-described printer, there is a possibility that a supply amount of the cleaning liquid to each of the caps may decrease, and cleaning may become difficult.

Embodiments of the broad principles derived herein provide a printer, a control method, and a non-transitory computer-readable medium storing computer-readable instructions that contribute to preventing insufficient cleaning.

A first aspect of the present disclosure relates to a printer including a first nozzle surface, a second nozzle surface, a first cap, a second cap, a cleaning liquid tank, a connecting flow path, a first branched flow path, a second branched flow path, a first pump, a second pump, a processor, and a memory. The first nozzle surface is provided with a first nozzle configured to eject a first ink. The second nozzle surface is provided with a second nozzle configured to eject a second ink. The first cap is configured to cover the first nozzle and closely adhere to the first nozzle surface. The second cap is configured to cover the second nozzle and closely adhere to the second nozzle surface. The cleaning liquid tank is configured to store a cleaning liquid. The connecting flow path is connected to the cleaning liquid tank. The first branched flow path connects the connecting flow path and the first cap to each other. The second branched flow path connects the connecting flow path and the second cap to each other. The first pump is provided in a first flow path connected to the first cap. The second pump is provided in a second flow path connected to the second cap. The memory stores computer-readable instructions that, when executed by the processor, cause the processor to perform processes. The processes include first supply processing of supplying the cleaning liquid from the cleaning liquid tank to the first cap via the connecting flow path and the first branched flow path, by driving the first pump during a first supply period in a state of the first cap being closely adhered to the first nozzle surface, and second supply processing of supplying the cleaning liquid from the cleaning liquid tank to the second cap via the connecting flow path and the second branched flow path, by driving the second pump during a second supply period in a state of the second cap being closely adhered to the second nozzle surface. The first supply period includes a first specific supply period that does not overlap with the second supply period.

According to the first aspect, since the first specific supply period does not overlap with the second supply period, in the first supply processing, during the first specific supply period, the first pump is driven in a state in which the second pump is stopped. Thus, compared to a case in which the first pump is driven in a state in which, during the first specific supply period, the second pump is being driven, a supply amount of the cleaning liquid to the first cap from the cleaning liquid tank is increased. As a result, the printer contributes to preventing insufficient cleaning.

A second aspect of the present disclosure relates to a control method controlling a printer including a first nozzle surface, a second nozzle surface, a first cap, a second cap, a cleaning liquid tank, a connecting flow path, a first branched flow path, a second branched flow path, a first pump, and a second pump. The first nozzle surface is provided with a first nozzle configured to eject a first ink. The second nozzle surface is provided with a second nozzle configured to eject a second ink. The first cap is configured to cover the first nozzle and closely adhere to the first nozzle surface. The second cap is configured to cover the second nozzle and closely adhere to the second nozzle surface. The cleaning liquid tank is configured to store a cleaning liquid. The connecting flow path is connected to the cleaning liquid tank. The first branched flow path connects the connecting flow path and the first cap to each other. The second branched flow path connects the connecting flow path and the second cap to each other. The first pump is provided in a first flow path connected to the first cap. The second pump is provided in a second flow path connected to the second cap. The control method includes first supply processing of supplying the cleaning liquid from the cleaning liquid tank to the first cap via the connecting flow path and the first branched flow path, by driving the first pump during a first supply period in a state of the first cap being closely adhered to the first nozzle surface, and second supply processing of supplying the cleaning liquid from the cleaning liquid tank to the second cap via the connecting flow path and the second branched flow path, by driving the second pump during a second supply period in a state of the second cap being closely adhered to the second nozzle surface. The first supply period includes a first specific supply period that does not overlap with the second supply period.

The second aspect contributes to the same advantage as the first aspect.

A third aspect of the present disclosure relates to a non-transitory computer-readable medium storing computer-readable instructions executed by a computer controlling a printer including a first nozzle surface, a second nozzle surface, a first cap, a second cap, a cleaning liquid tank, a connecting flow path, a first branched flow path, a second branched flow path, a first pump, and a second pump. The first nozzle surface is provided with a first nozzle configured to eject a first ink. The second nozzle surface is provided with a second nozzle configured to eject a second ink. The first cap is configured to cover the first nozzle and closely adhere to the first nozzle surface. The second cap is configured to cover the second nozzle and closely adhere to the second nozzle surface. The cleaning liquid tank is configured to store a cleaning liquid. The connecting flow path is connected to the cleaning liquid tank. The first branched flow path connects the connecting flow path and the first cap to each other. The second branched flow path connects the connecting flow path and the second cap to each other. The first pump is provided in a first flow path connected to the first cap. The second pump is provided in a second flow path connected to the second cap. The instructions, when executed by the computer, cause the computer to perform processes. The processes include first supply processing of supplying the cleaning liquid from the cleaning liquid tank to the first cap via the connecting flow path and the first branched flow path, by driving the first pump during a first supply period in a state of the first cap being closely adhered to the first nozzle surface, and second supply processing of supplying the cleaning liquid from the cleaning liquid tank to the second cap via the connecting flow path and the second branched flow path, by driving the second pump during a second supply period in a state of the second cap being closely adhered to the second nozzle surface. The first supply period includes a first specific supply period that does not overlap with the second supply period.

The third aspect contributes to the same advantage as the first aspect.

DESCRIPTION

Figure 1:
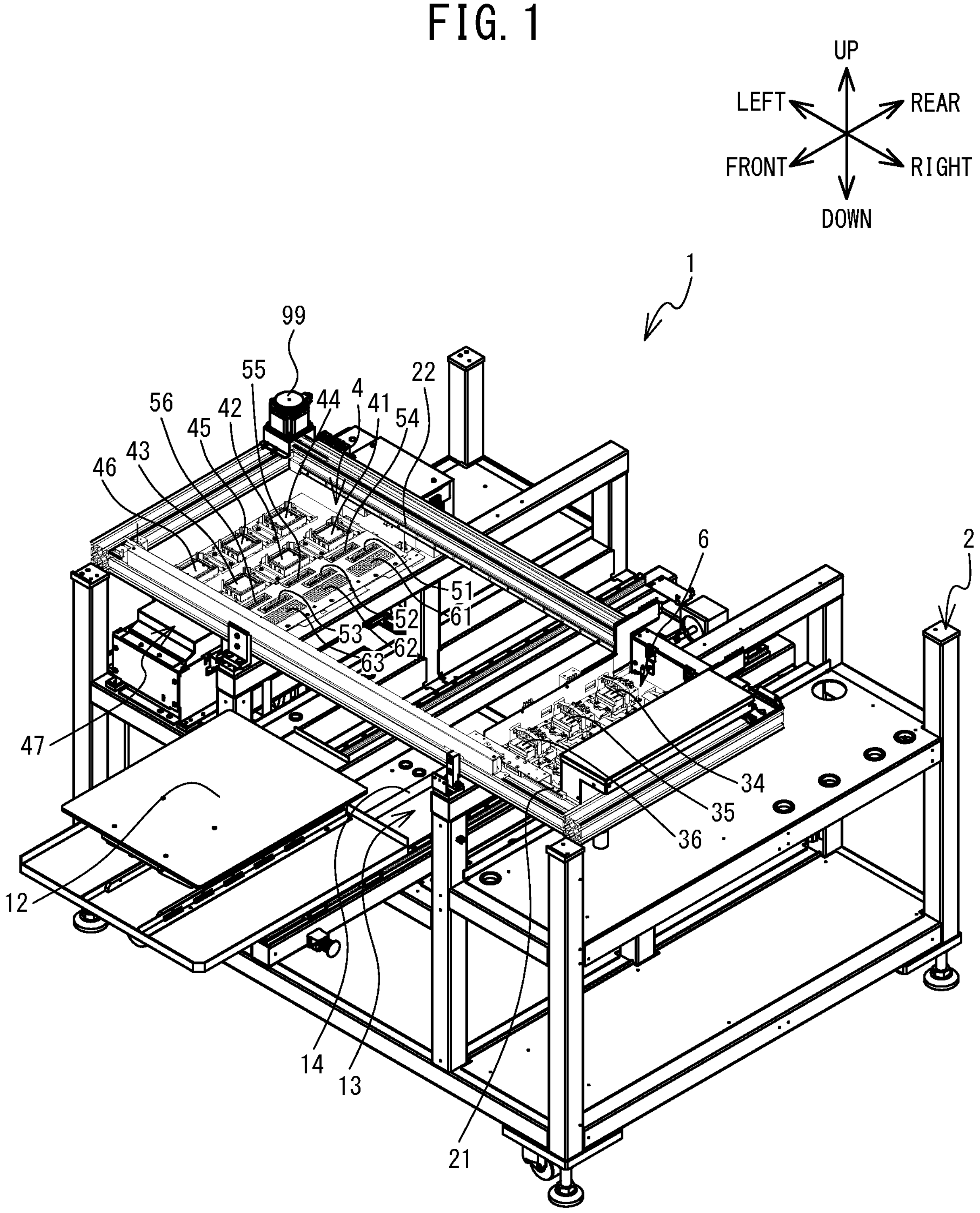
FIG. 1 is a perspective view showing an internal configuration of a printer.

A printer 1 related to one embodiment of the present disclosure will be described with reference to the drawings. The directions of up, down, lower left, upper right, lower right, and upper left in FIG. 1 correspond to the upper side, lower side, front, rear, right, and left, respectively, of the printer 1. The up-down direction in FIG. 1 is the vertical direction. In the present embodiment, the mechanical elements in the drawings are shown at actual scale.

Hereinafter, white color ink will be referred to as "white ink." When collectively referring to black, cyan, yellow, and magenta inks, or when one of those inks is not particularly specified, they will be referred to as "color ink" or "color inks." When collectively referring to fluorescent color, gold color, silver color, metallic color, transparent, or pastel inks, or when one of those inks is not particularly specified, they will be referred to as "special ink" or "special inks." A viscosity of the white ink used in the present embodiment is higher than a viscosity of the color ink used in the present embodiment, and is higher than a viscosity of the special ink used in the present embodiment. When collectively referring to the white ink, the color ink, and the special ink, or when one of these inks is not particularly specified, they will be referred to simply as "ink." The printer 1 shown in FIG. 1 is an inkjet printer, and performs printing by ejecting the ink onto a print medium (not shown in the drawings). The print medium is cloth, paper, or the like, and is a T-shirt, for example.

Figure 2:
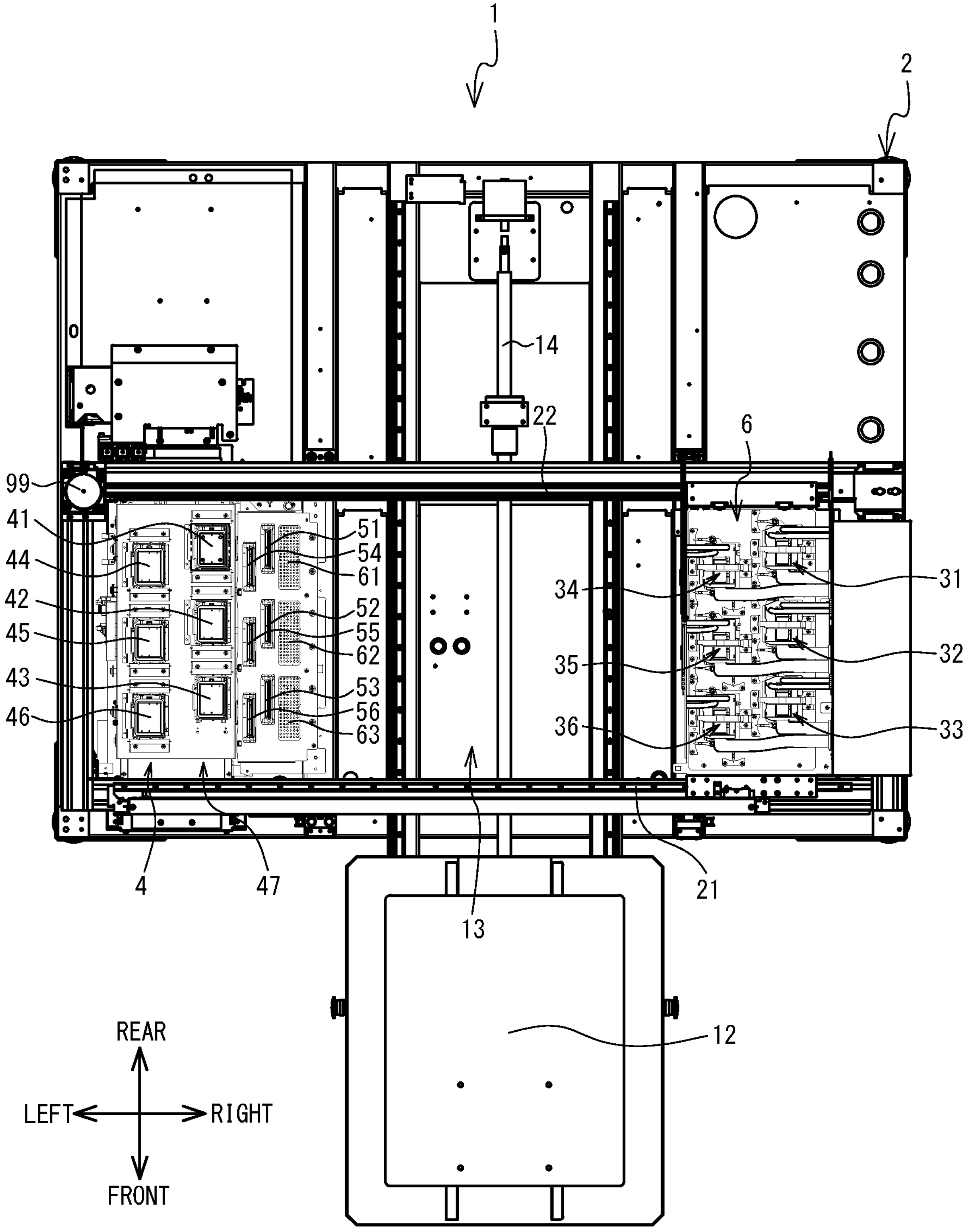
FIG. 2 is a plan view showing the internal configuration of the printer.

A mechanical configuration of the printer 1 will be described with reference to FIG. 1 and FIG. 2. As shown in FIG. 1 and FIG. 2, the printer 1 is provided with a frame body 2, a support shaft 14, a platen 12, a pair of guide rails 21 and 22, a carriage 6, a plurality of heads 31, 32, 33, 34, 35, and 36, and a maintenance mechanism 4. The frame body 2 is configured in a lattice shape by a plurality of shafts extending in the up-down direction, a plurality of shafts extending in the left-right direction, and a plurality of shafts extending in the up-down direction. An opening 13 is formed in the frame body 2. The opening 13 penetrates the frame body 2 in the front-rear direction, at the center thereof in the left-right direction.

The support shaft 14 is fixed to the frame body 2 inside the opening 13, and extends in the front-rear direction. The platen 12 is positioned inside the opening 13 in a front view. The platen 12 is a plate, and extends in the front-rear direction and the left-right direction. The print medium is placed on the platen 12. The platen 12 is supported by the support shaft 14, and moves in the front-rear direction along the support shaft 14. Thus, in the present embodiment, the front-rear direction is a sub-scanning direction. FIG. 1 and FIG. 2 show a state in which the platen 12 is positioned at the front end of a movement range of the platen 12.

The pair of guide rails 21 and 22 are fixed to the upper end of the frame body 2. The guide rail 21 is disposed at the front end of the frame body 2, and extends in the left-right direction from the left end to the right end of the frame body 2. The guide rail 22 is disposed at substantially the center of the frame body 2 in the front-rear direction, and extends in the left-right direction from the left end to the right end of the frame body 2.

The carriage 6 is a plate, and extends in the front-rear direction and the left-right direction between the pair of guide rails 21 and 22. The carriage 6 is supported by the pair of guide rails 21 and 22 and moves in the left-right direction along the pair of guide rails 21 and 22. Thus, in the present embodiment, the left-right direction is a main scanning direction. FIG. 1 and FIG. 2 show a state in which the carriage 6 is positioned at the right end of a movement range of the carriage 6.

Figure 3:
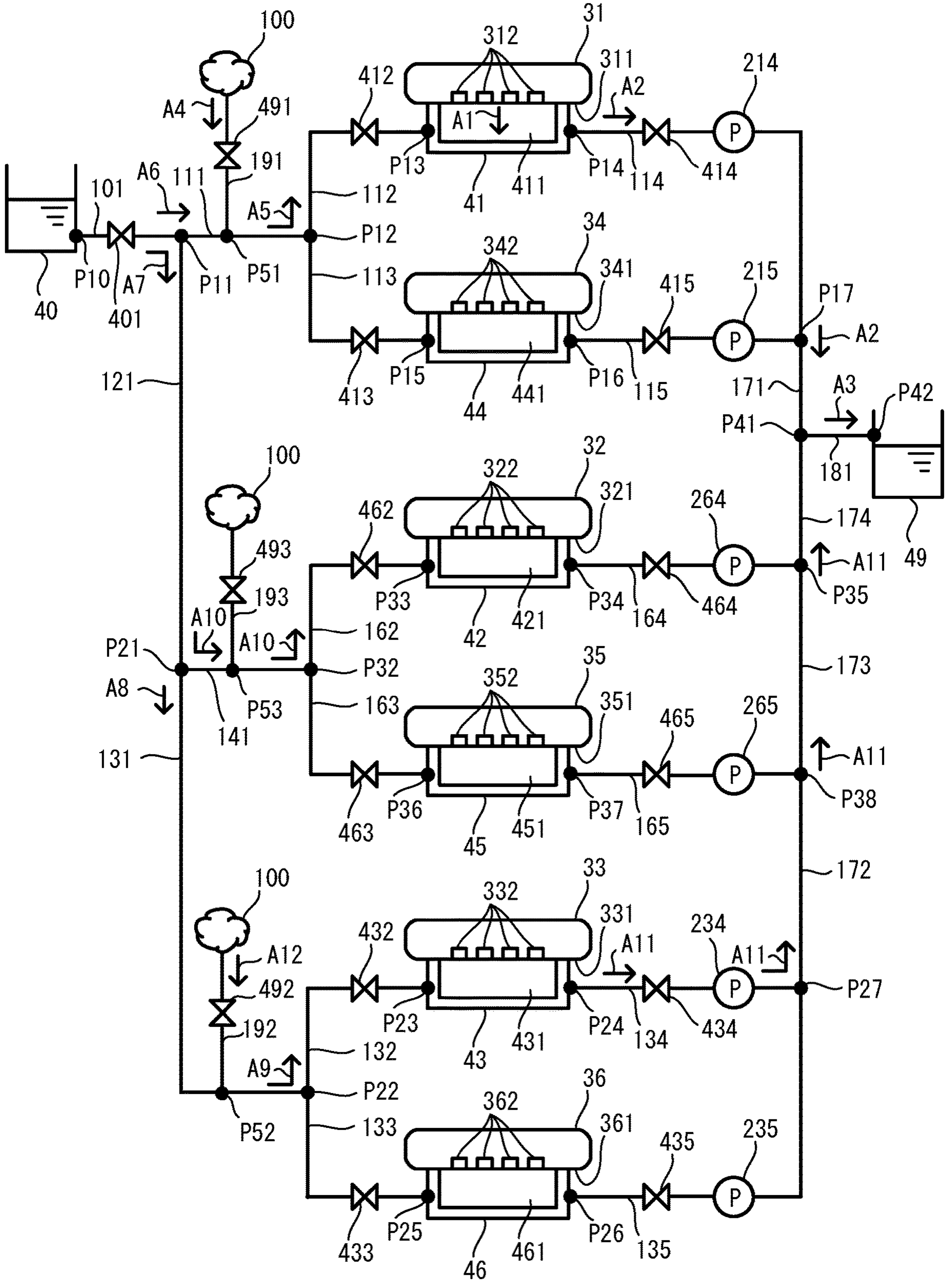
FIG. 3 is a flow path configuration view between a cleaning liquid tank and a waste liquid tank.

The heads 31 to 36 are mounted to the carriage 6. The head 31 is a cuboid shape and includes a nozzle surface 311 shown in FIG. 3. The nozzle surface 311 is formed at the lower surface of the head 31, and is exposed downward from the carriage 6. The nozzle surface 311 is positioned higher than the platen 12. A plurality of nozzles 312 shown in FIG. 3 are provided in the nozzle surface 311. The plurality of nozzles 312 are openings for ejecting the ink.

Each of the heads 32 to 36 have the same configuration as the head 31. In other words, the heads 32 to 36 respectively include nozzle surfaces 321, 331, 341, 351, and 361 shown in FIG. 3. A plurality of nozzles 322, 332, 342, 352, and 362 shown in FIG. 3 are respectively provided in the nozzle surfaces 321, 331, 341, 351, and 361.

As shown in FIG. 2, the heads 31 to 33 are positioned at a right portion of the carriage 6 and are arranged in a row in the order of the heads 31, 32, and 33 from the rear toward the front. The heads 34 to 36 are positioned to the left of the heads 31 to 33, and are arranged in a row in the order of the heads 34, 35, and 36 from the rear toward the front.

The white ink is supplied to each of the heads 31 and 34 from a tank or a cartridge (not shown in the drawings) in which the white ink is stored. Each of the heads 31 and 34 selectively ejects the supplied white ink from the plurality of nozzles 312 and 342 shown in FIG. 3. Thus, for example, the plurality of nozzles 312 only eject the one type of the white ink.

The special ink is supplied to each of the heads 32 and 35 from a tank or a cartridge (not shown in the drawings) in which the special ink is stored. Each of the heads 32 and 35 selectively ejects the supplied special ink from the plurality of nozzles 322 and 352 shown in FIG. 3. Thus, for example, the plurality of nozzles 322 include the nozzles 322 for ejecting a first color of the special ink, the nozzles 322 for ejecting a second color of the special ink different from the first color, and the like.

The color ink is supplied to each of the heads 33 and 36 from a tank or a cartridge (not shown in the drawings) in which the color ink is stored. Each of the heads 33 and 36 selectively ejects the supplied color ink from the plurality of nozzles 332 and 362 shown in FIG. 3. Thus, for example, the plurality of nozzles 332 include the nozzles 332 for ejecting the black color ink, the nozzles 332 for ejecting the cyan color ink, the nozzles 332 for ejecting the yellow color ink, and the nozzles 332 for ejecting the magenta color ink.

The maintenance mechanism 4 is a mechanism for maintaining the heads 31 to 36, and is positioned at a left portion of the frame body 2. The maintenance mechanism 4 will be described in more detail later.

An example of a print operation by the printer 1 will be described. The printer 1 moves the platen 12 in the front-rear direction (the sub-scanning direction). The printer 1 ejects the inks from the heads 31 to 36 while moving the carriage 6 in the left-right direction (the main scanning direction) in a state in which the platen 12 is facing the nozzle surfaces 311, 321, 331, 341, 351, and 361.

For example, the printer 1 ejects the white ink, as a background, onto the print medium on the platen 12 from the heads 31 and 34. In this way, the background of the white ink is printed on the print medium. The printer 1 ejects the ink from the heads 31 to 36 onto the background, or directly onto the print medium. In this way, a color image is printed onto the background or directly onto the print medium.

The maintenance mechanism 4 will be described with reference to FIG. 1 to FIG. 3. The maintenance mechanism 4 is provided with a plurality of caps 41 to 46 shown in FIG. 1 to FIG. 3, a plurality of wipers 51 to 56 shown in FIG. 2, a plurality of flushing boxes 61 to 63 shown in FIG. 1 and FIG. 2, a cleaning liquid tank 40 shown in FIG. 3, and a waste liquid tank 49 shown in FIG. 3.

As shown in FIG. 1 to FIG. 3, the cap 41 is an elastic body and is a cuboid shape that is open upward. A cap space 411 shown in FIG. 3 is formed inside the cap 41. The cap space 411 is a space surrounded by the side surfaces and the bottom surface of the cap 41. Each of the plurality of caps 42 to 46 has the same shape as the cap 41. Thus, cap spaces 421, 431, 441, 451, and 461 are respectively formed inside the plurality of caps 42 to 46. As shown in FIG. 1 and FIG. 2, the plurality of caps 41 to 46 are supported by a support plate 47. The support plate 47 extends in the front-rear direction and the left-right direction, and moves the plurality of caps 41 to 46 in the up-down direction independently of each other or simultaneously with each other.

Each of the plurality of caps 41 to 46 is provided lower than a movement path of the carriage 6 and further to the left than a movement path of the platen 12. Positional relationships of the respective plurality of caps 41 to 46 are the same as the positional relationships of each of the heads 31 to 36. Thus, when the carriage 6 is positioned at the left end of the movement range of the carriage 6, the plurality of caps 41 to 46 respectively face the plurality of heads 31 to 36 in the up-down direction.

When the support plate 47 moves upward in the state in which the plurality of caps 41 to 46 respectively face the plurality of heads 31 to 36 in the up-down direction, the cap 41, for example, covers the plurality of nozzles 312 from below, and is closely adhered to the nozzle surface 311 (refer to FIG. 3). Similarly, each of the caps 42 to 46 cover the plurality of nozzles 322, 332, 342, 352, and 362 from below, and are closely adhered to the nozzle surfaces 321, 331, 341, 351, and 361.

Hereinafter, the state in which the caps 41 to 46 respectively cover the plurality of nozzles 312, 322, 332, 342, 352, and 362 and are closely adhered to the nozzle surfaces 311, 321, 331, 341, 351, and 361 will be referred to as a "capped state" (refer to FIG. 3). A state in which the caps 41 to 46 are respectively separated from the plurality of nozzles 312, 322, 332, 342, 352, and 362 will be referred to as an "uncapped state" (refer to FIG. 1 and FIG. 2). An operation in which the printer 1 causes the caps 41 to 46 to be in the capped state will be referred to as a "capping operation." An operation in which the printer 1 causes the caps 41 to 46 to be in the uncapped state will be referred to as an "uncapping operation." During a period in which the printer 1 is not performing the print operation, the capping operation is performed in order to suppress drying of the ink inside the heads 31 to 36.

The plurality of wipers 51 to 56 are respectively positioned to the right of the plurality of caps 41 to 46, and are positioned in the same positions, in the front-rear direction, as the plurality of caps 41 to 46. The plurality of wipers 51 to 56 are provided lower than the movement path of the carriage 6, and further to the left than the movement path of the platen 12. Positional relationships of the respective plurality of wipers 51 to 56 are the same as the positional relationships of each of the heads 31 to 36.

Each of the plurality of wipers 51 to 56 moves to a retracted position (refer to FIG. 1 and FIG. 2), and a protruding position (not shown in the drawings). The retracted position is the position of the plurality of wipers 51 to 56 when the respective upper ends of the plurality of wipers 51 to 56 are positioned lower than the nozzle surfaces 311, 321, 331, 341, 351, and 361. Thus, in the state in which the plurality of wipers 51 to 56 are positioned at the retracted position, even when the carriage 6 moves in the left-right direction, the plurality of wipers 51 to 56 do not come into contact with the nozzle surfaces 311, 321, 331, 341, 351, and 361, respectively.

The protruding position is a position of the plurality of wipers 51 to 56 when the respective upper ends of the plurality of wipers 51 to 56 are positioned higher than the nozzle surfaces 311, 321, 331, 341, 351, and 361. Thus, when the carriage 6 moves in the left-right direction in the state in which the plurality of wipers 51 to 56 are positioned at the protruding position, the plurality of wipers 51 to 56 come into contact with the nozzle surfaces 311, 321, 331, 341, 351, and 361, respectively. In this way, the plurality of wipers 51 to 56 can respectively wipe off the ink or the like attached to the nozzle surfaces 311, 321, 331, 341, 351, and 361. Hereinafter, an operation in which the printer 1 causes the plurality of wipers 51 to 56 to wipe off the ink or the like attached to the nozzle surfaces 311, 321, 331, 341, 351, and 361, respectively, will be referred to as a "wiping operation."

The plurality of flushing boxes 61 to 63 are respectively positioned to the right of the plurality of wipers 51 to 56. The plurality of flushing boxes 61 to 63 are provided lower than the movement path of the carriage 6 and further to the left than the movement path of the platen 12. The plurality of flushing boxes 61 to 63 are aligned in the order of the flushing boxes 61, 62, and 63 from the rear toward the front.

In the front-rear direction, the flushing box 61 extends from a position of the rear end of the head 31 to a position of the front end of the head 34. In the front-rear direction, the flushing box 62 extends from a position of the rear end of the head 32 to a position of the front end of the head 35. In the front-rear direction, the flushing box 63 extends from a position of the rear end of the head 33 to a position of the front end of the head 36.

The flushing box 61 receives the white ink ejected from the nozzles 312 and 342 when the heads 31 and 34 are flushed. The flushing box 62 receives the special ink ejected from the nozzles 322 and 352 when the heads 32 and 35 are flushed. The flushing box 63 receives the color ink ejected from the nozzles 332 and 362 when the heads 33 and 36 are flushed. Hereinafter, an operation in which the printer 1 causes the plurality of heads 31 to 36 to eject the respective inks toward the flushing boxes 61 to 63 will be referred to as a "flushing operation."

As shown in FIG. 3, the cleaning liquid tank 40 stores a cleaning liquid for cleaning nozzle surfaces 311, 321, 331, 341, 351, and 361 or the caps 41 to 46. The cleaning liquid preferably dissolves the ink attached to the nozzle surfaces 311, 321, 331, 341, 351, and 361 or the caps 41 to 46, for example. A viscosity of the cleaning liquid is lower than a viscosity of the inks. The cleaning liquid tank 40 is connected to each of the plurality of caps 41 to 46. Thus, the cleaning liquid is supplied to each of the plurality of caps 41 to 46 from the cleaning liquid tank 40.

The waste liquid tank 49 is connected to each of the plurality of caps 41 to 46. The waste liquid tank 49 receives waste liquid from each of the plurality of caps 41 to 46. In the present embodiment, the waste liquid is a liquid including both or one of the cleaning liquid or the ink.

A flow path configuration between the cleaning liquid tank 40 and the waste liquid tank 49 will be described with reference to FIG. 3. In the present embodiment, each of the flow paths is configured by a tube. A flow path 101 is connected to the cleaning liquid tank 40 at a point P10. The flow path 101 extends from the point P10 to a point P11. A cleaning liquid valve 401 is provided in the flow path 101. At the point P11, the flow path 101 branches into a flow path 111 and a flow path 121. The flow path 111 extends from the point P11 to a point P12, and at the point P12, branches into a flow path 112 and a flow path 113.

The flow path 112 extends from the point P12 to a point P13, and is connected to the cap 41 at the point P13. A first upstream valve 412 is provided in the flow path 112. A flow path 114 is connected to the cap 41 at a point P14. The flow path 114 extends from the point P14 to a point P17. A first downstream valve 414 and a first pump 214 are provided in the flow path 114. The first downstream valve 414 and the first pump 214 are arranged in the order of the first downstream valve 414 and the first pump 214 from the point P14 toward the point P17. The first pump 214 causes the waste liquid to flow from the point P14 to the point P17 in the flow path 114.

The flow path 113 extends from the point P12 to a point P15, and is connected to the cap 44 at the point P15. A first upstream valve 413 is provided in the flow path 113. A flow path 115 is connected to the cap 44 at a point P16. The flow path 115 extends from the point P16 to the point P17, and converges with the flow path 114 at the point P17. A first downstream valve 415 and a first pump 215 are provided in the flow path 115. The first downstream valve 415 and the first pump 215 are arranged in the order of the first downstream valve 415 and the first pump 215 from the point P16 toward the point P17. The first pump 215 causes the waste liquid to flow from the point P16 to the point P17 in the flow path 115.

At the point P17, the converged flow path 114 and flow path 115 are connected to a flow path 171. The flow path 171 extends from the point P17 to a point P41, and converges with a flow path 174 at the point P41. At the point P41, the converged flow path 171 and flow path 174 are connected to a flow path 181. The flow path 181 extends from the point P41 to a point P42, and is connected to the waste liquid tank 49 at the point P42.

The flow path 121 extends from the point P11 to a point P21, and at the point P21, branches into a flow path 131 and a flow path 141. The flow path 131 extends from the point P21 to a point P22, and at the point P22, branches into a flow path 132 and a flow path 133. The flow path 132 extends from the point P22 to a point P23, and is connected to the cap 43 at the point P23. A second upstream valve 432 is provided in the flow path 132. A flow path 134 is connected to the cap 43 at a point P24. The flow path 134 extends from the point P24 to a point P27. A second downstream valve 434 and a second pump 234 are provided in the flow path 134. The second downstream valve 434 and the second pump 234 are arranged in the order of the second downstream valve 434 and the second pump 234 from the point P24 toward the point P27. The second pump 234 causes the waste liquid to flow from the point P24 toward the point P27 in the flow path 134.

The flow path 133 extends from the point P22 to a point P25, and is connected to the cap 46 at the point P25. A second upstream valve 433 is provided in the flow path 133. A flow path 135 is connected to the cap 46 at a point P26. The flow path 135 extends from the point P26 to the point P27. A second downstream valve 435 and a second pump 235 are provided in the flow path 135. The second downstream valve 435 and the second pump 235 are arranged in the order of the second downstream valve 435 and the second pump 235 from the point P26 toward the point P27. The second pump 235 causes the waste liquid to flow from the point P26 toward the point P27 in the flow path 135.

The flow path 135 converges with the flow path 134 at the point P27. At the point P27, the converged flow path 134 and flow path 135 are connected to a flow path 172. The flow path 172 extends from the point P27 to a point P38, and converges with a flow path 165, to be described later, at the point P38.

The flow path 141 extends from the point P21 to a point P32, and at the point P32, branches into a flow path 162 and a flow path 163. The flow path 162 extends from the point P32 to a point P33, and is connected to the cap 42 at the point P33. A third upstream valve 462 is provided in the flow path 162. A flow path 164 is connected to the cap 42 at a point P34. The flow path 164 extends from the point P34 to a point P35. A third downstream valve 464 and a third pump 264 are provided in the flow path 164. The third downstream valve 464 and the third pump 264 are arranged in the order of the third downstream valve 464 and the third pump 264 from the point P34 toward the point P35. The third pump 264 causes the waste liquid to flow from the point P34 toward the point P35 in the flow path 164.

The flow path 163 extends from the point P32 to a point P36, and is connected to the cap 45 at the point P36. A third upstream valve 463 is provided in the flow path 163. The flow path 165 is connected to the cap 45 at a point P37. The flow path 165 extends from the point P37 to the point P38. A third downstream valve 465 and a third pump 265 are provided in the flow path 165. The third downstream valve 465 and the third pump 265 are arranged in the order of the third downstream valve 465 and the third pump 265 from the point P37 toward the point P38. The third pump 265 causes the waste liquid to flow from the point P37 toward the point P38 in the flow path 165.

At the point P38, the converged flow path 165 and flow path 172 are connected to a flow path 173. The flow path 173 extends from the point P38 to the point P35, and converges with the flow path 164 at the point P35. At the point P35, the converged flow path 164 and flow path 173 are connected to the flow path 174. The flow path 174 extends from the point P35 to the point P41, and converges with the flow path 171 at the point P41.

A flow path 191 is connected to the flow path 111 at a point P51. The point P51 is positioned between the point P11 and the point P12. The flow path 191 extends from the point P51 and is connected to outside air 100. A first atmospheric valve 491 is provided in the flow path 191. A flow path 192 is connected to the flow path 131 at a point P52. The point P52 is positioned between the point P21 and the point P22. The flow path 192 extends from the point P52, and is connected to the outside air 100. A second atmospheric valve 492 is provided in the flow path 192. A flow path 193 is connected to the flow path 141 at a point P53. The point P53 is positioned between the point P21 and the point P32. The flow path 193 extends from the point P53 and is connected to the outside air 100. A third atmospheric valve 493 is provided in the flow path 193.

Each of the above-described valves have the same function, respectively. That is, when the valve is open, the open valve causes the flow path to be communicated. In this case, the liquid can flow through the flow path via the open valve. For example, when the cleaning liquid valve 401 is open, the cleaning liquid can flow through the flow path 101 via the open cleaning liquid valve 401. When the valve is closed, the closed valve shuts off the flow path. In this case, the liquid cannot flow through the flow path via the closed valve. For example, when the cleaning liquid valve 401 is closed, the cleaning liquid cannot flow through the flow path 101 via the closed cleaning liquid valve 401.

In the present embodiment, when each of the above-described pumps is in a stopped state, the pump compresses the flow path in which the respective pump is provided. Thus, the liquid cannot flow through the flow path via the stopped pump. For example, when the first pump 214 is in the stopped state, the waste liquid cannot flow through the flow path 114 via the stopped first pump 214.

The electrical configuration of the printer 1 will be explained with reference to FIG. 4. The printer 1 is provided with a control board 80. A CPU 81, a ROM 82, a RAM 83, and a flash memory 84 are provided on the control board 80. The CPU 81 controls the printer 1 and is electrically connected to the ROM 82, the RAM 83, and the flash memory 84. The ROM 82 stores a control program used for the CPU 81 to control operations of the printer 1, and various pieces of information and the like needed by the CPU 81 when executing various programs. The RAM 83 temporarily stores various data used by the control program. The flash memory 84 is a non-volatile memory, and stores print data for performing the printing, and the like.

A main scanning motor 99, a sub-scanning motor 97, a cap motor 48, the wiper motors 76 and 77, a head driver 30, pump motors 201 to 206, solenoids 471 to 486, and an operation portion 17 are electrically connected to the CPU 81. The main scanning motor 99, the sub-scanning motor 97, the cap motor 48, the wiper motors 76 and 77, the head driver 30, the pump motors 201 to 206, and the solenoids 471 to 486 are driven by control by the CPU 81.

The main scanning motor 99 moves the carriage 6 shown in FIG. 2 in the left-right direction. The sub-scanning motor 97 moves the platen 12 shown in FIG. 2 in the front-rear direction. The cap motor 48 moves the support plate 47 shown in FIG. 2 in the up-down direction. The wiper motor 76 moves the wipers 51 to 53 shown in FIG. 2 to the protruding position and to the retracted position. The wiper motor 77 moves the wipers 54 to 56 to the protruding position and to the retracted position. The head drives 30 ejects the ink from the heads 31 to 36 shown in FIG. 2.

The pump motor 201 drives the first pump 214 shown in FIG. 3. Similarly, the pump motors 202 to 206 respectively drive the first pump 215, the second pumps 234 and 235, and the third pumps 264 and 265 shown in FIG. 3.

The solenoid 471 opens and closes the cleaning liquid valve 401 shown in FIG. 3. Similarly, the solenoids 472 to 486 respectively open and close the first upstream valves 412 and 413, the first downstream valves 414 and 415, the second upstream valves 432 and 433, the second downstream valves 434 and 435, the third upstream valves 462 and 463, the third downstream valves 464 and 465, the first atmospheric valve 491, the second atmospheric valve 492, and the third atmospheric valve 493 shown in FIG. 3.

The operation portion 17 is a touch panel and the like, and outputs information, to the CPU 81, in accordance with an operation by a user. By the user operating the operation portion 17, a print command for starting the printing by the printer 1, a maintenance command for performing a main processing and the like can be input to the printer 1.

The main processing will be described with reference to FIG. 3 to FIG. 8. For example, when the maintenance command is input via the operation portion 17 shown in FIG. 4, when printing has been performed on a certain number of print media by the printer 1, or when a certain period of time has elapsed from the previous main processing, the CPU 81 performs the main processing by reading out the control program from the ROM 82 and executing the control program.

At the start of the main processing, the cleaning liquid valve 401, the first upstream valves 412 and 413, the first downstream valves 414 and 415, the second upstream valves 432 and 433, the second downstream valves 434 and 435, the third upstream valves 462 and 463, the third downstream valves 464 and 465, the first atmospheric valve 491, the second atmospheric valve 492, and the third atmospheric valve 493 are all in the closed state. For example, if there is the valve in the open state, the CPU 81 performs control to cause the valve that is in the open state at the start of the main processing to be in the closed state.

Figure 7:
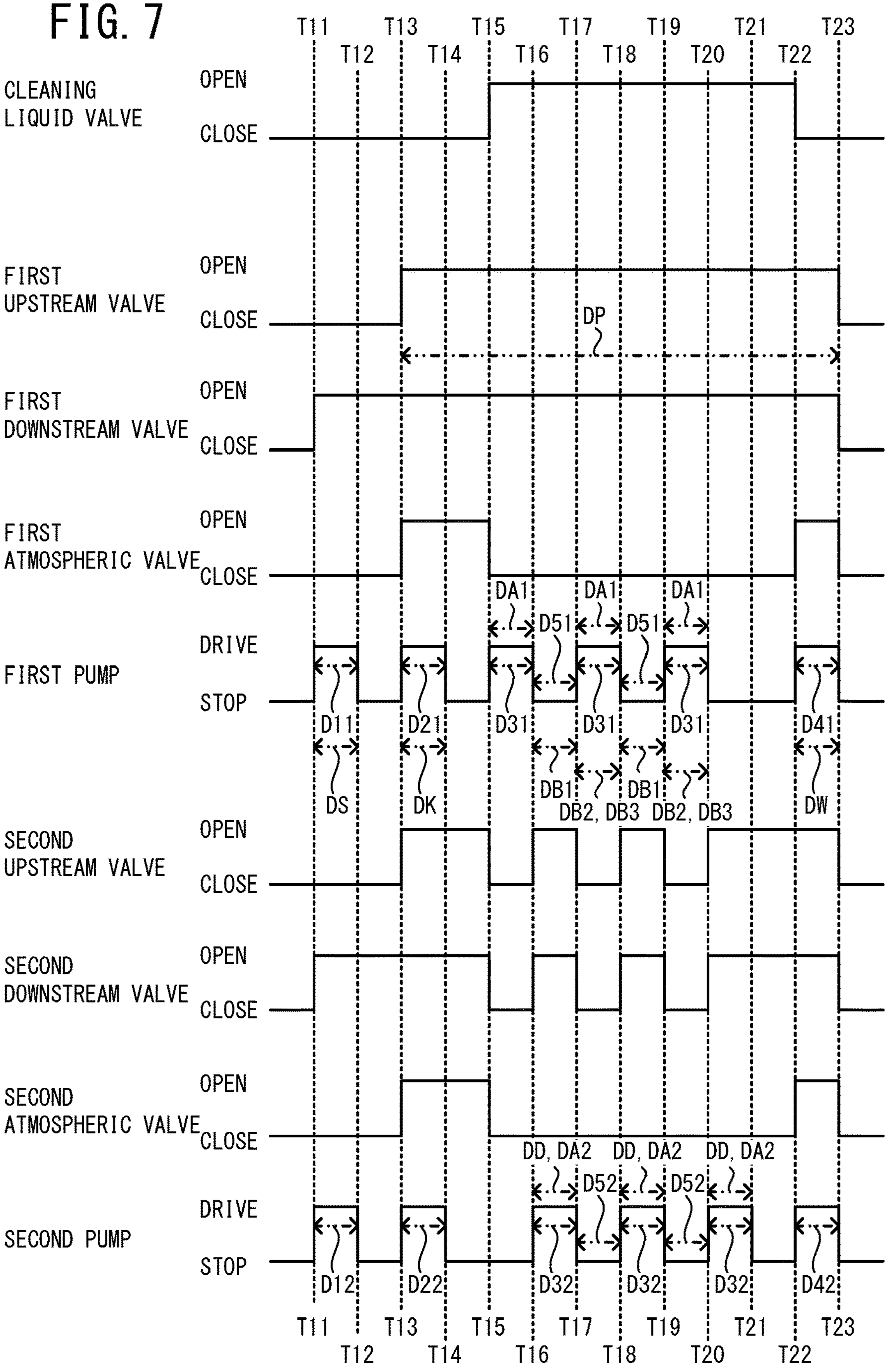
FIG. 7 is a timing chart showing relationships between the opening and closing of each of valves and the driving and stopping of pumps.
Figure 8:
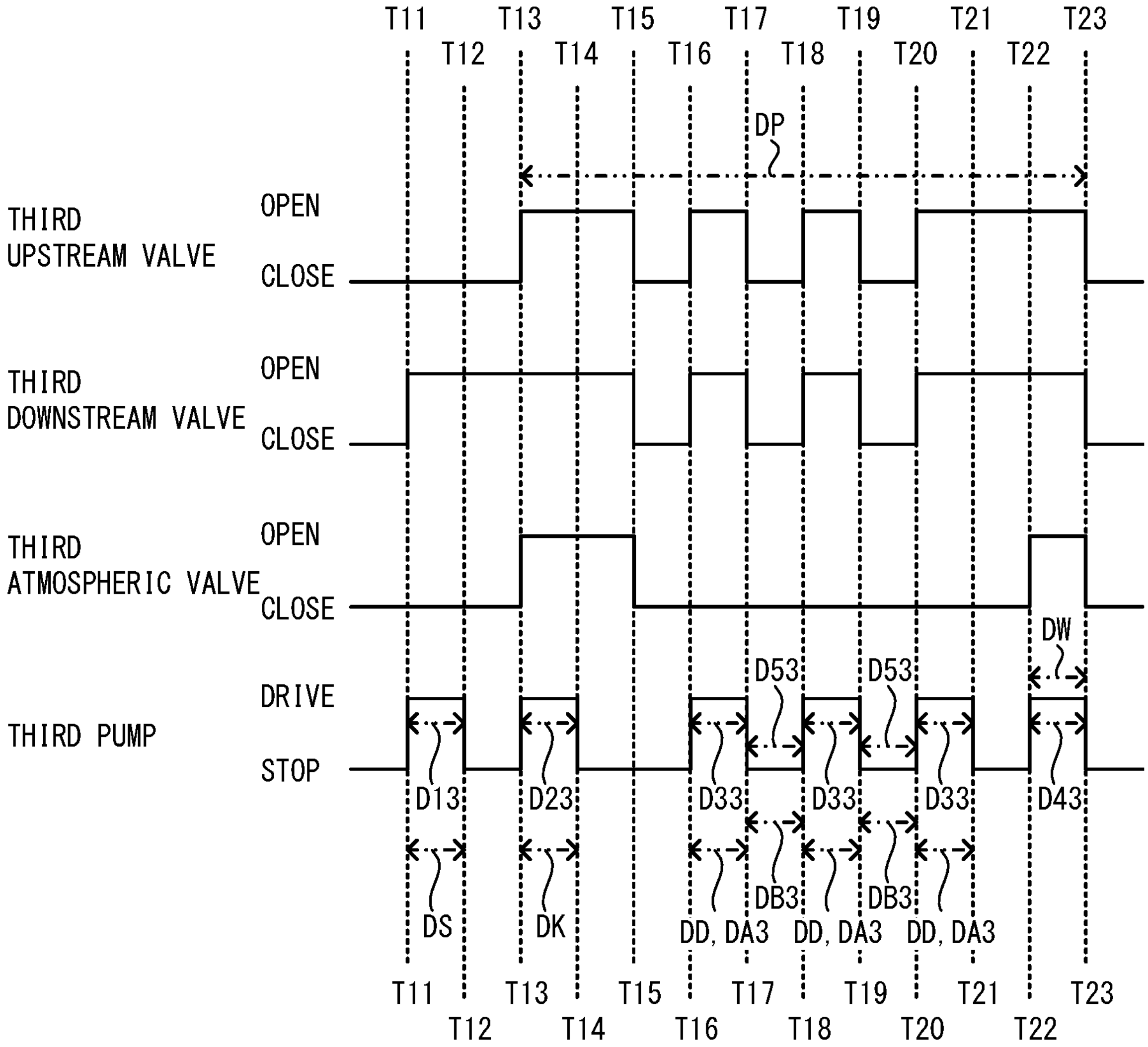
FIG. 8 is a timing chart showing relationships between the opening and closing of each of valves and the starting and stopping of a pump.

In FIG. 7 and FIG. 8, time points T11 to T23 are in the chronological order of the time points T11, T12, T13, T14, T15, T16, T17, T18, T19, T20, T21, T22, and T23. In FIG. 7 and FIG. 8, periods between each of the time points T11 to T23 that are adjacent to each other are indicated as equal intervals, but in actuality, the periods need not necessarily be equal intervals.

In FIG. 7, no distinction is made between the first pumps 214 and 215 and they are denoted by "first pump," no distinction is made between the first upstream valves 412 and 413 and they are denoted by "first upstream valve," and no distinction is made between the first downstream valves 414 and 415 and they are denoted by "first downstream valve." No distinction is made between the second pumps 234 and 235 and they are denoted by "second pump," no distinction is made between the second upstream valves 432 and 433 and they are denoted by "second upstream valve," and no distinction is made between the second downstream valves 434 and 435 and they are denoted by "second downstream valve." In FIG. 8, no distinction is made between the third pumps 264 and 265 and they are denoted by "third pump," no distinction is made between the third upstream valves 462 and 463 and they are denoted by "third upstream valve," and no distinction is made between the third downstream valves 464 and 465 and they are denoted by "third downstream valve."

Figure 4:
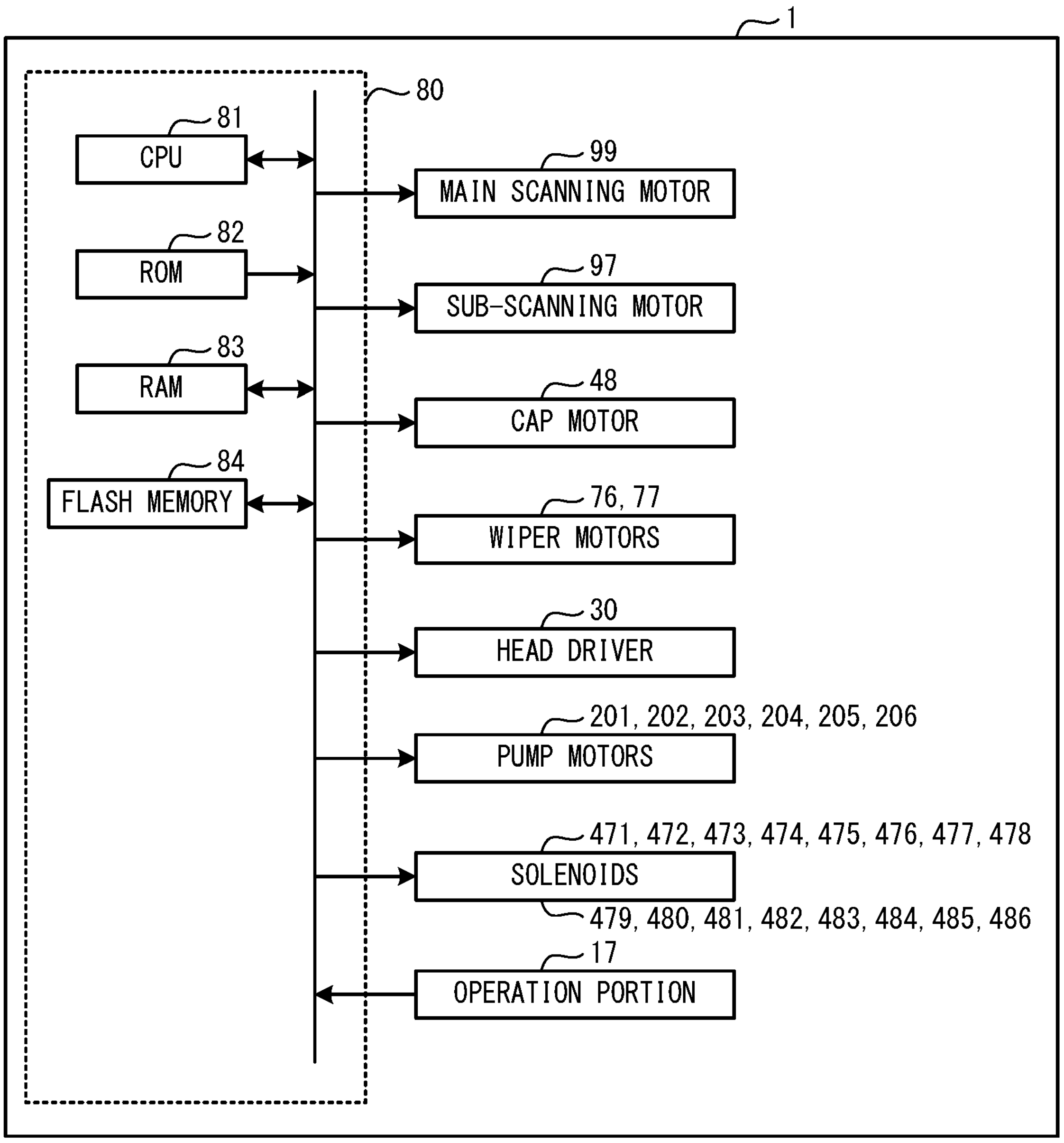
FIG. 4 is a block diagram showing an electrical configuration of the printer.
Figure 5:
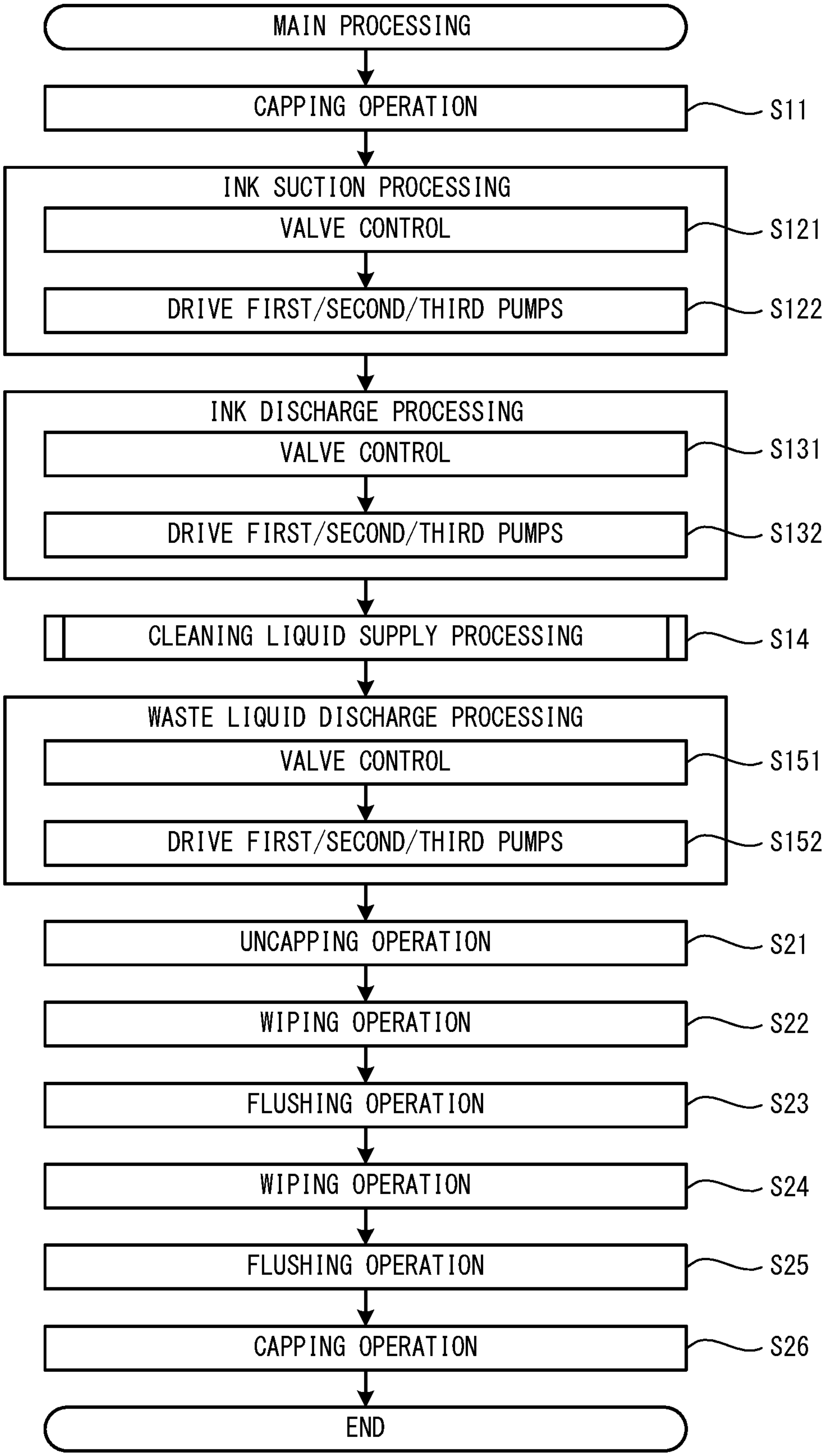
FIG. 5 is a flowchart of main processing.

As shown in FIG. 5, when the main processing is started, the CPU 81 performs the capping operation (S11). In the processing at S11, the CPU 81 controls the main scanning motor 99 shown in FIG. 4, and moves the carriage 6 shown in FIG. 2 to the position at which the caps 41 to 46 shown in FIG. 3 respectively face the nozzle surfaces 311, 321, 331, 341, 351, and 361. The CPU 81 controls the cap motor 48 shown in FIG. 4, and raises the support plate 47 shown in FIG. 1. In this way, the plurality of caps 41 to 46 are in the capped state (refer to FIG. 3). The CPU 81 performs processing from S121 onward in the capped state.

Ink Suction Processing

At the time point T11 shown in FIG. 7 and FIG. 8, the CPU 81 performs ink suction processing. In the ink suction processing, the ink is sucked from each of the nozzle 312, 322, 332, 342, 352, and 362 shown in FIG. 3, and ink purging is performed. Specifically, the CPU 81 performs valve control (S121). In the processing at S121, the CPU 81 controls the solenoids 474, 475, 478, 479, 482, and 483 shown in FIG. 4 and opens the first downstream valves 414 and 415, the second downstream valves 434 and 435, and the third downstream valves 464 and 465 shown in FIG. 3. The cleaning liquid valve 401, the first upstream valves 412 and 413, the second upstream valves 432 and 433, the third upstream valves 462 and 463, the first atmospheric valve 491, the second atmospheric valve 492, and the third atmospheric valve 493 shown in FIG. 3 remain in the closed state.

In a state in which the valve control has been performed by the processing at S121 (refer to the time point T11 shown in FIG. 7 and FIG. 8), the CPU 81 controls the pump motors 201 to 206 shown in FIG. 4, and drives the first pumps 214 and 215, the second pumps 234 and 235, and the third pumps 264 and 265 shown in FIG. 3 (S122).

For example, if components in the ink precipitate, or evaporate, the viscosity of the ink inside the heads 31 to 36 increases. In the processing at S122, as shown in FIG. 3, the first pump 214 sucks the white ink having the high viscosity from the head 31, for example. In this way, the white ink having the high viscosity is caused to be ejected into the cap space 411 from the head 31 via the plurality of nozzles 312 (refer to an arrow A1). Thus, for the white ink inside the head 31, the white ink having the high viscosity is replaced by the white ink having the relatively low viscosity. Similarly, the inks inside the heads 32 to 36 are respectively caused to be ejected into the cap spaces 421, 431, 441, 451, and 461. Hereinafter, the ink ejected from the heads 31 to 36 by the processing at S122 will be referred to as "waste ink."

In the processing at S122, as shown in FIG. 7 and FIG. 8, the CPU 81 drives the first pumps 214 and 215 during a first suction period D11, drives the second pumps 234 and 235 during a second suction period D12, and drives the third pumps 264 and 265 during a third suction period D13. When the first suction period D11 has elapsed, the CPU 81 stops the first pumps 214 and 215. When the second suction period D12 has elapsed, the CPU 81 stops the second pumps 234 and 235. When the third suction period D13 has elapsed, the CPU 81 stops the third pumps 264 and 265.

Hereinafter, a period in which the first suction period D11 and the second suction period D12 overlap with each other, in which the second suction period D12 and the third suction period D13 overlap with each other, or in which the first suction period D11 and the third suction period D13 overlap with each other will be referred to as an "overlapping suction period DS." When each of the first suction period D11, the second suction period D12, and the third suction period D13 are all completely offset from each other, for example, a time period required for ink suction processing becomes equal to or greater than a total time period of the lengths of each of the first suction period D11, the second suction period D12, and the third suction period D13.

In the present embodiment, the first suction period D11, the second suction period D12, and the third suction period D13 include the overlapping suction period DS. In other words, in each of the first suction period D11, the second suction period D12, and the third suction period D13, there are periods in which they overlap each other. Note that, in the present embodiment, a first period "includes" a second period refers to both a case in which the whole of the first period is the second period, and a case in which a part of the first period is the second period.

In the present embodiment, each of the first suction period D11, the second suction period D12, the third suction period D13 is a period from the time point T11 to the time point T12, and they match each other. Thus, in the present embodiment, the whole of the first suction period D11, the whole of the second suction period D12, and the whole of the third suction period D13 are the overlapping suction period DS. In this case, the time period required for the ink suction processing is the length of the overlapping suction period DS, and is shorter than the total time period of the lengths of each of the first suction period D11, the second suction period D12, and the third suction period D13.

Ink Discharge Processing

As shown in FIG. 5, the CPU 81 performs ink discharge processing at the time point T13 shown in FIG. 7 and FIG. 8. In the ink discharge processing, the waste ink is discharged from each of the caps 41 to 46 to the waste liquid tank 49. More specifically, the CPU 81 performs valve control (S131). In the processing at S131, the CPU 81 controls the solenoids 472, 473, 476, 477, 480, 481, 484, 485, and 486 shown in FIG. 4 and opens the first upstream valves 412 and 413, the second upstream valves 432 and 433, the third upstream valves 462 and 463, the first atmospheric valve 491, the second atmospheric valve 492, and the third atmospheric valve 493 shown in FIG. 3. In this way, the cap spaces 411, 421, 431, 441, 451, and 461 are connected to the outside air 100. The cleaning liquid valve 401 remains in the closed state. The first downstream valves 414 and 415, the second downstream valves 434 and 435, and the third downstream valves 464 and 465 remain in the open state.

In the state in which the valve control by the processing at S131 has been performed (refer to the time point T13 shown in FIG. 7 and FIG. 8), the CPU 81 controls the pump motors 201 to 206 shown in FIG. 4, and drives the first pumps 214 and 215, the second pumps 234 and 235, and the third pumps 264 and 265 shown in FIG. 3 (S132). In the processing at S132, as shown in FIG. 3, the first pump 214 discharges the waste ink from the cap space 411 to the waste liquid tank 49 via the flow paths 114, 171, and 181, for example (refer to arrows A2 and A3). In this case, the outside air 100 is supplied to the cap space 411 via the flow paths 191, 111, and 112 (refer to arrows A4 and A5).

Similarly, the waste ink is discharged to the waste liquid tank 49 from the cap spaces 421, 431, 441, 451, and 461. By performing the ink discharge processing, when the cap spaces 411, 421, 431, 441, 451, and 461 are filled with the cleaning liquid by cleaning liquid supply processing at S14 to be described later, the waste liquid is suppressed from entering into the nozzles 312, 322, 332, 342, 352, and 362.

In the processing at S132, as shown in FIG. 7 and FIG. 8, the CPU 81 drives the first pumps 214 and 215 during a first ink discharge period D21, drives the second pumps 234 and 235 during a second ink discharge period D22, and drives the third pumps 264 and 265 during a third ink discharge period D23. When the first ink discharge period D21 has elapsed, the CPU 81 stops the first pumps 214 and 215. When the second ink discharge period D22 has elapsed, the CPU 81 stops the second pumps 234 and 235. When the third ink discharge period D23 has elapsed, the CPU 81 stops the third pumps 264 and 265.

Hereinafter, a period in which the first ink discharge period D21 and the second ink discharge period D22 overlap each other, in which the second ink discharge period D22 and the third ink discharge period D23 overlap each other, or in which the first ink discharge period D21 and the third ink discharge period D23 overlap each other will be referred to as an “overlapping ink discharge period DK.” The first ink discharge period D21, the second ink discharge period D22, and the third ink discharge period D23 include the overlapping ink discharge period DK. In other words, in each of the first ink discharge period D21, the second ink discharge period D22, and the third ink discharge period D23, there are periods in which they overlap each other.

In the present embodiment, each of the first ink discharge period D21, the second ink discharge period D22, and the third ink discharge period D23 is a period from the time point T13 to the time point T14, and they match each other. Thus, in the present embodiment, the whole of the first ink discharge period D21, the whole of the second ink discharge period D22, and the whole of the third ink discharge period D23 are the overlapping ink discharge period DK. In this case, the time period required for the ink discharge processing is the length of the overlapping ink discharge period DK, and is shorter than a total time period of the lengths of each of the first ink discharge period D21, the second ink discharge period D22, and the third ink discharge period D23.

Cleaning Liquid Supply Processing

Figure 6:
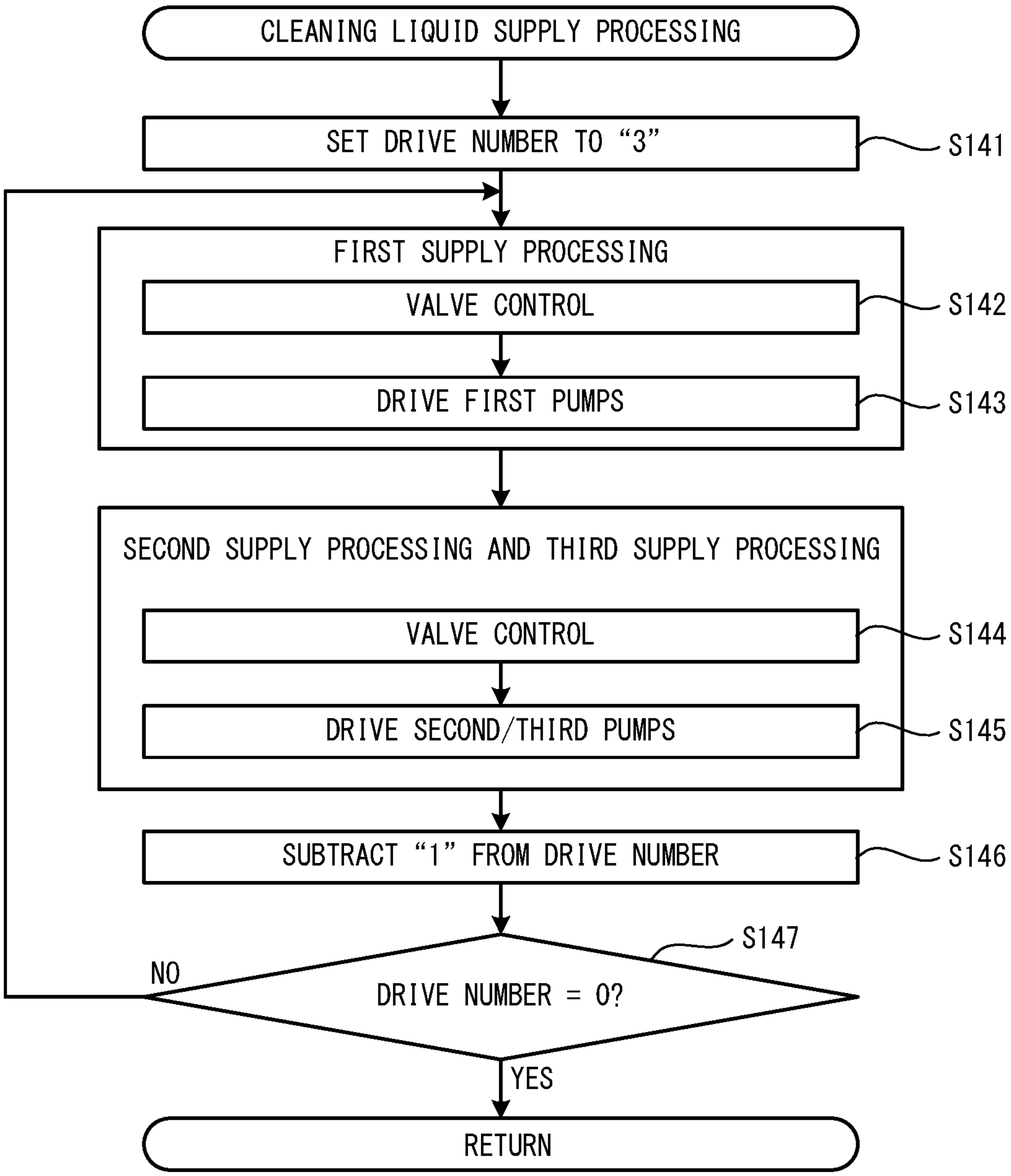
FIG. 6 is a flowchart of cleaning liquid supply processing.

As shown in FIG. 5, the CPU 81 performs the cleaning liquid supply processing (S14). As shown in FIG. 6, when the cleaning liquid supply processing is started, the CPU 81 sets a drive number counter to a predetermined number (S141). The drive number counter is stored in the RAM 83, and counts a number of times driving is to be performed. The drive number indicates an end condition for the cleaning liquid supply processing. The predetermined number is not limited to a specific number and is “3” in the present embodiment.

At the time point T15 shown in FIG. 7 and FIG. 8, the CPU 81 performs first supply processing. The first supply processing is repeatedly performed a number of times corresponding to the number of times the driving is to be performed (three times in the present embodiment). The first supply processing performed the second time and the third time is respectively performed at the time points T17 and T19 shown in FIG. 7 and FIG. 8. In the first supply processing, the cleaning liquid is supplied from the cleaning liquid tank 40 to each of the caps 41 and 44.

More specifically, the CPU 81 performs valve control (S142). In the processing at S142, the CPU 81 controls the solenoids 476, 477, 478, 479, 480, 481, 482, 483, 484, 485, and 486 shown in FIG. 4, and closes the second upstream valves 432 and 433, the second downstream valves 434 and 435, the third upstream valves 462 and 463, the third downstream valves 464 and 465, the first atmospheric valve 491, the second atmospheric valve 492, and the third atmospheric valve 493 shown in FIG. 3. The CPU 81 controls the solenoid 471 shown in FIG. 4 and opens the cleaning liquid valve 401 shown in FIG. 3. The first upstream valves 412 and 413 and the first downstream valves 414 and 415 shown in FIG. 3 remain in the open state.

In a state in which the valve control by the processing at S142 has been performed (refer to the time point T15 shown in FIG. 7 and FIG. 8), the CPU 81 controls the pump motors 201 and 202 shown in FIG. 4 and drives the first pumps 214 and 215 shown in FIG. 3 (S143). In the processing at S143, as shown in FIG. 3, the first pump 214 supplies the cleaning liquid from the cleaning liquid tank 40 to the cap space 411 via the flow paths 101, 111, and 112, for example (refer to an arrow A6 and the arrow A5). Similarly, the cleaning liquid is supplied to the cap space 441. In this way, the bottom surface and the side surfaces of the caps 41 and 44 are cleaning by the cleaning liquid.

The cap spaces 411 and 441 may be filled by the cleaning liquid by any one of the first time, the second time, or the third time of the processing at S143. In the present embodiment, an amount of the cleaning liquid such that the cap spaces 411 and 441 are filled with the cleaning liquid by the third time of the processing at S143 (the predetermined number of times) is supplied to the cap spaces 411 and 441 in each of the times of the processing at S143. When the cap spaces 411 and 441 are filled with the cleaning liquid, the cleaning liquid comes into contact with the nozzle surfaces 311 and 341. As a result of the cleaning liquid coming into contact with the nozzle surfaces 311 and 341, the nozzle surfaces 311 and 341 are cleaned by the cleaning liquid. The cleaning liquid need not necessarily come into contact with the nozzle surfaces 311 and 341 in the processing of the predetermined number at S143, for example. In other words, the cleaning liquid supply processing may be ended without the cleaning liquid coming into contact with the nozzle surfaces 311 and 341. In this case, the cleaning liquid can clean at least the bottom surface and the side surfaces of the caps 41 and 44.

In the processing at S143, as shown in FIG. 7, the CPU 81 drives the first pumps 214 and 215 during a first supply period D31. When the first supply period D31 has elapsed, the CPU 81 stops the first pumps 214 and 215. In the present embodiment, the first supply period D31 at the first time, the second time, and the third time of the processing at S143 is a period from the time point T15 to the time point T16, a period from the time point T17 to the time point T18, and a period from the time point T19 to the time point T20, respectively.

As shown in FIG. 6, at the time point T16 shown in FIG. 7 and FIG. 8, the CPU 81 performs second supply processing and third supply processing. The second supply processing and the third supply processing are repeatedly performed a number of times corresponding to the number of times the driving is to be performed (three times in the present embodiment). Each of the second supply processing and the third supply processing is repeatedly performed a number of times corresponding to the number of times the driving is to be performed (three times in the present embodiment). The second supply processing and the third supply processing performed the second time and the third time are respectively performed at the time points T18 and 20 shown in FIG. 7 and FIG. 8. In the second supply processing, the cleaning liquid is supplied from the cleaning liquid tank 40 to each of the caps 43 and 46. In the third supply processing, the cleaning liquid is supplied from the cleaning liquid tank 40 to each of the caps 42 and 45. In the present embodiment, the second supply processing and the third supply processing are performed in parallel.

More specifically, the CPU 81 performs valve control (S144). In the processing at S144, the CPU 81 controls the solenoids 476, 477, 478, 479, 480, 481, 482, and 483 shown in FIG. 4 and opens the second upstream valves 432 and 433, the second downstream valves 434 and 435, the third upstream valves 462 and 463, and the third downstream valves 464 and 465 shown in FIG. 3. The cleaning liquid valve 401, the first upstream valves 412 and 413, and the first downstream valves 414 and 415 shown in FIG. 3 remain in the open state. The first atmospheric valve 491, the second atmospheric valve 492, and the third atmospheric valve 493 shown in FIG. 3 remain in the closed state.

In a state in which the valve control by the processing at S144 has been performed (refer to the time point T16 shown in FIG. 7 and FIG. 8), the CPU 81 controls the pump motors 203, 204, 205, and 206 shown in FIG. 4, and drives the second pumps 234 and 235 and the third pumps 264 and 265 shown in FIG. 3 (S145). In the processing at S145, as shown in FIG. 3, the second pump 234 supplies the cleaning liquid from the cleaning liquid tank 40 to the cap space 431 via the flow paths 101, 121, 131, and 132, for example (refer to arrows A7, A8, and A9). The third pump 264 supplies the cleaning liquid from the cleaning liquid tank 40 to the cap space 421 via the flow paths 101, 121, 141, and 162, for example (refer to the arrow A7 and arrows A10). Similarly, the cleaning liquid is supplied to the cap spaces 451 and 461.

In the present embodiment, similarly to the processing at S143, the cap spaces 421, 431, 451, and 461 are filled with the cleaning liquid by the third time (the predetermined number of times) of the processing at S145. In the second time of the processing at S145, the cap spaces 421, 431, 451, and 461 are not filled with the cleaning liquid, and thus, a time period over which the cleaning liquid is in contact with the nozzle surfaces 321, 331, 351, and 361 is suppressed from becoming long. As a result, a defect caused by mixing of colors of the color inks, or a defect caused by mixing of colors of the special inks are suppressed.

In the processing at S145, as shown in FIG. 7 and FIG. 8, the CPU 81 drives the second pumps 234 and 235 during a second supply period D32, and drives the third pumps 264 and 265 during a third supply period D33. When the second supply period D32 has elapsed, the CPU 81 stops the second pumps 234 and 235. When the third supply period D33 has elapsed, the CPU 81 stops the third pumps 264 and 265.

Hereinafter, of the third supply period D33, a period that overlaps with at least one of the first supply period D31 or the second supply period D32 will be referred to as an "overlapping supply period DD." If, for example, the third supply period D33 is completely offset from the second supply period D32, a time period required for the second supply processing and the third supply processing becomes equal to or longer than a total time period of the lengths of each of the second supply period D32 and the third supply period D33. In the present embodiment, the third supply period D33 includes the overlapping supply period DD. In other words, in the third supply period D33, there is a period that overlaps with at least one of the first supply period D31 or the second supply period D32.

In the present embodiment, the second supply period D32 at the first time, the second time, and the third time of the processing at S145 is a period from the time point T16 to the time point T17, a period from the time point T18 to the time point T19, and a period from the time point T20 to the time point T21, respectively. The third supply period D33 at the first time, the second time, and the third time of the processing at S145 is the period from the time point T16 to the time point T17, the period from the time point T18 to the time point T19, and the period from the time point T20 to the time point T21, respectively. Thus, the second supply period D32 and the third supply period D33 match each other. As a result, in the present embodiment, the whole of the third supply period D33 is the overlapping supply period DD. In this case, the time period required for the second supply processing and the third supply processing is the length of the overlapping supply period DD, and is shorter than the total time period of the lengths of each of the second supply period D32 and the third supply period D33.

Hereinafter, a period of the first supply period D31 that does not overlap with the second supply period D32 and the third supply period D33 will be referred to as a "first specific supply period DA1." A period of the second supply period D32 that does not overlap with the first supply period D31 and the third supply period D33 will be referred to as a "second specific supply period DA2." A period of the third supply period D33 that does not overlap with the first supply period D31 and the second supply period D32 will be referred to as a "third specific supply period DA3."

For example, a period of the first supply period D31 that does not overlap with the second supply period D32 and does not overlap with the third supply period D33 corresponds to the first specific supply period DA1. The configuration is not limited to this example, and a period of the first supply period D31 that overlaps with one of the second supply period D32 or the third supply period D33 and does not overlap with the other corresponds to the first specific supply period DA1, for example. On the other hand, a period of the first supply period D31 that overlaps with the second supply period D32 and the third supply period D33 does not correspond to the first specific supply period DA1, for example.

If, for example, each of the first supply period D31, the second supply period D32, and the third supply period D33 completely match each other, the driving of all of the first pumps 214 and 215, the second pumps 234 and 235, and the third pumps 264 and 265 starts simultaneously, and stops simultaneously. During the period in which all of the first pumps 214 and 215, the second pumps 234 and 235, and the third pumps 264 and 265 are being driven simultaneously, there is a possibility that a flow path resistance in the flow path 101 may become larger. When the flow path resistance in the flow path 101 becomes larger, there is a possibility that a supply amount of the cleaning liquid from the cleaning liquid tank 40 to the cap 41 may decrease.

In the present embodiment, the first supply period D31 includes the first specific supply period DA1. The second supply period D32 includes the second specific supply period DA2. The third supply period D33 includes the third specific supply period DA3. In other words, in the first supply period D31, there is the period that does not overlap with the second supply period D32 and the third supply period D33. In the second supply period D32, there is the period that does not overlap with the first supply period D31 and the third supply period D33. In the third supply period D33, there is the period that does not overlap with the first supply period D31 and the second supply period D32.

In the present embodiment, a start point of each of the second supply period D32 and the third supply period D33 in the N-th processing (N is a natural integer) at S145 is later than a start point of the first supply period D31 (refer to FIG. 7) in the N-th processing at S143, and matches an end point of the first supply period D31 (refer to FIG. 7) in the N-th processing at S143. A start point of the first supply period D31 (refer to FIG. 7) in the N+1-th processing at S143 is later than a start point of each of the second supply period D32 and the third supply period D33 in the N-th processing at S145, and matches an end point of each of the second supply period D32 and the third supply period D33 in the N-th processing at S145.

Strictly speaking, the start point of each of the second supply period D32 and the third supply period D33 in the N-th processing at S145 is slightly later than the end point of the first supply period D31 (refer to FIG. 7) in the N-th processing at S143. The start point of the first supply period D31 (refer to FIG. 7) in the N+1-th processing at S143 is slightly later than the end point of each of the second supply period D32 and the third supply period D33 in the N-th processing at S145. In other words, the whole of the first supply period D31 shown in FIG. 7 does not overlap with the second supply period D32 and the third supply period D33, and the whole of the second supply period D32 and the whole of the third supply period D33 do not overlap with the first supply period D31 shown in FIG. 7. Thus, in the present embodiment, the whole of the first supply period D31 is the first specific supply period DA1, the whole of the second supply period D32 is the second specific supply period DA2, and the whole of the third supply period D33 is the third specific supply period DA3. In this case, all of the first pumps 214 and 215, the second pumps 234 and 235, and the third pumps 264 and 265 are not simultaneously driven, and thus, the flow path resistance in the flow path 101 is suppressed from becoming large. In this way, the possibility of the supply amount of the cleaning liquid decreasing is suppressed, thus avoiding insufficient cleaning.

In the processing at S145, as shown in FIG. 7, the CPU 81 stops the first pumps 214 and 215 during a first stop period D51. During the first stop period D51, a negative pressure in the cap spaces 411 and 441 falls, and becomes close to atmospheric pressure. For example, as a result of the negative pressure in the cap space 411 falling, the white ink is suppressed from being sucked via the nozzles 312. In the processing at S143, as shown in FIG. 7 and FIG. 8, the CPU 81 stops the second pumps 234 and 235 during a second stop period D52, and stops the third pumps 264 and 265 during a third stop period D53. During the second stop period D52, the negative pressure in the cap spaces 431 and 461 falls. During the third stop period D53, the negative pressure in the cap spaces 421 and 451 falls.

Hereinafter, subsequent to the first supply processing, in the second supply processing and the third supply processing, processing to stop the first pumps 214 and 215 during the first stop period D51 will be referred to as "first stop processing." Subsequent to the second supply processing, in the first supply processing, processing to stop the second pumps 234 and 235 during the second stop period D52 will be referred to as "second stop processing." In the processing at S145, subsequent to the third supply processing, in the first supply processing, processing to stop the third pumps 264 and 265 during the third stop period D53 will be referred to as "third stop processing." In the present embodiment, the N-th second supply processing and third supply processing are the N-th first stop processing. The N+1-th first supply processing is the N-th second stop processing and third stop processing.

The CPU 81 alternately repeats the first supply processing and the first stop processing, in the order of the first supply processing and the first stop processing, until a number of times of driving to be performed in processing at S147 to be described later becomes zero times. The CPU 81 alternately repeats the second supply processing and the second stop processing, in the order of the second supply processing and the second stop processing, until the number of times of the driving to be performed in the processing at S147 to be described later becomes zero times. The CPU 81 alternately repeats the third supply processing and the third stop processing, in the order of the third supply processing and the third stop processing, until the number of times of the driving to be performed in the processing at S147 to be described later becomes zero times.

Of the first stop period D51, a period that overlaps with at least one of the second specific supply period DA2 (the second supply period D32 in the present embodiment) or the third specific supply period DA3 (the third supply period D33 in the present embodiment) will be referred to as a "first overlapping stop period DB1." Of the second stop period D52, a period that overlaps with the first specific supply period DA1 (the first supply period D31 shown in FIG. 7 in the present embodiment) will be referred to as a "second overlapping stop period DB2." Of the third stop period D53, a period that overlaps with the first specific supply period DA1 will be referred to as a "third overlapping stop period DB3."

If, for example, the first stop period D51 is completely offset from each of the second specific supply period DA2 and the third specific supply period DA3, a time period required for the first stop processing, the second supply processing, and the third supply processing becomes equal to or greater than a total time period of the lengths of each of the first stop period D51 and the second specific supply period DA2 or the third specific supply period DA3.

As shown in FIG. 7 and FIG. 8, the first stop period D51 in the N-th first stop processing includes the first overlapping stop period DB1 in the N-th first supply processing. In other words, in the first stop period D51 in the N-th first stop processing, there is the period that overlaps with the second specific supply period DA2 and the third specific supply period DA3. In the present embodiment, the first stop period D51 in the N-th first stop processing matches each of the second supply period D32 in the N-th second supply processing, and the third supply period D33 in the N-th third supply processing. Thus, the whole of the first stop period D51 in the N-th first stop processing is the first overlapping stop period DB1 in the N-th first stop processing. In this case, the time period required for the first stop processing, the second supply processing, and the third supply processing becomes the length of the first overlapping stop period DB1, and is shorter than the total time period of the lengths of each of the first stop period D51 and the second specific supply period DA2 or the third specific supply period DA3.

The second stop period D52 in the N-th second stop processing includes the second overlapping stop period DB2 in the N+1-th first supply processing. The third stop period D53 in the N-th third stop processing includes the third overlapping stop period DB3 in the N+1-th first supply processing. In the present embodiment, the second stop period D52 and the third stop period D53 respectively match the first supply period D31 in the N+1-th first supply processing. Thus, the whole of the second stop period D52 in the N-th second stop processing is the second overlapping stop period DB2 in the N+1-th first supply processing, and the whole of the third stop period D53 in the N-th third stop processing is the third overlapping stop period DB3 in the N+1-th first supply processing.

Hereinafter, a period, of the second supply period D32 and the third supply period D33, in which the first upstream valves 412 and 413 and the first downstream valves 414 and 415 are in the open state will be referred to as an "open period DP." The second supply period D32 and the third supply period D33 each include the open period DP. In the present embodiment, subsequent to opening the first upstream valves 412 and 413 at the start point of the first ink discharge period D21 (the time point T13), and opening the first downstream valves 414 and 415 at the start point of the first suction period D11 (the time point T11), the CPU 81 maintains the first upstream valves 412 and 413 and the first downstream valves 414 and 415 in the open state from the start point of the first supply period D31 (the time point T15) until the end point of each of the second supply period D32 and the third supply period D33 (the time point T21). Thus, the whole of the second supply period D32 and the whole of the third supply period D33 are the open period DP.

The CPU 81 subtracts "1" from a value of the drive number counter (S146). The CPU 81 determines whether or not the value of the drive number counter is "0" (S147). When the value of the drive number counter is not "0" (no at S147), the CPU 81 returns the processing to the processing at S142. In this case, the CPU 81 repeats the processing from S142 to S146 until the value of the drive number counter becomes "0." When the value of the drive number counter has become "0" (yes at S147), the CPU 81 returns the processing to the main processing shown in FIG. 5.

Waste Liquid Discharge Processing

As shown in FIG. 5, the CPU 81 performs waste liquid discharge processing. In the waste liquid discharge processing, the waste liquid is discharged from each of the caps 41 to 46 to the waste liquid tank 49. Specifically, at the time point T22 shown in FIG. 7 and FIG. 8, the CPU 81 performs valve control (S151). In the processing at S151, the CPU 81 controls the solenoid 471 shown in FIG. 4, and closes the cleaning liquid valve 401 shown in FIG. 3. The CPU 81 controls the solenoids 484, 485, and 486 shown in FIG. 4, and opens the first atmospheric valve 491, the second atmospheric valve 492, and the third atmospheric valve 493 shown in FIG. 3. The first upstream valves 412 and 413, the first downstream valves 414 and 415, the second upstream valves 432 and 433, the second downstream valves 434 and 435, the third upstream valves 462 and 463, and the third downstream valves 464 and 465 remain in the open state.

In a state in which the valve control by the processing at S151 has been performed (refer to the time point T22 shown in FIG. 7 and FIG. 8), the CPU 81 controls the pump motors 201 to 206 shown in FIG. 4, and drives the first pumps 214 and 215, the second pumps 234 and 235, and the third pumps 264 and 265 shown in FIG. 3 (S152). In the processing at S152, as shown in FIG. 3, the first pump 214 discharges the waste liquid to the waste liquid tank 49 from the cap space 411 via the flow paths 114, 117, and 181, for example (refer to the arrows A2 and A3). In this case, the outside air 100 is supplied to the cap space 411 via the flow paths 191, 111, and 112 (refer to the arrows A4 and A5).

The second pump 234 discharges the waste liquid to the waste liquid tank 49 from the cap space 431 via the flow paths 134, 172, 173, 174, and 181, for example (refer to arrows A11 and the arrow A3). In this case, the outside air 100 is supplied to the cap space 431 via the flow paths 192 and 132 (refer to an arrow A12 and the arrow A9). Similarly, the waste liquid is discharged to the waste liquid tank 49 from the cap spaces 421, 431, 441, 451, and 461. By performing the waste liquid discharge processing, the waste liquid is suppressed from overflowing from the caps 41 to 46 when the uncapping operation is performed by processing at S21 to be described later.

In the processing at S152, as shown in FIG. 7 and FIG. 8, the CPU 81 drives the first pumps 214 and 215 during a first waste liquid discharge period D41, drives the second pumps 234 and 235 during a second waste liquid discharge period D42, and drives the third pumps 264 and 265 during a third waste liquid discharge period D43. When the first waste liquid discharge period D41 has elapsed, the CPU 81 stops the first pumps 214 and 215. When the second waste liquid discharge period D42 has elapsed, the CPU 81 stops the second pumps 234 and 235. When the third waste liquid discharge period D43 has elapsed, the CPU 81 stops the third pumps 264 and 265.

Hereinafter, a period in which the first waste liquid discharge period D41 and the second waste liquid discharge period D42 overlap each other, in which the second waste liquid discharge period D42 and the third waste liquid discharge period D43 overlap each other, or the first waste liquid discharge period D41 and the third waste liquid discharge period D43 overlap each other will be referred to as an "overlapping waste liquid discharge period DW." The first waste liquid discharge period D41, the second waste liquid discharge period D42, and the third waste liquid discharge period D43 include the overlapping waste liquid discharge period DW. In other words, in each of the first waste liquid discharge period D41, the second waste liquid discharge period D42, and the third waste liquid discharge period D43, there is a period in which they overlap each other.

In the present embodiment, each of the first waste liquid discharge period D41, the second waste liquid discharge period D42, and the third waste liquid discharge period D43 is a period from the time point T22 to the time point T23, and they match each other. Thus, in the present embodiment, the whole of the first waste liquid discharge period D41, the whole of the second waste liquid discharge period D42, and the whole of the third waste liquid discharge period D43 are the overlapping waste liquid discharge period DW. In this case, the time period required for the waste liquid discharge processing is the length of the overlapping waste liquid discharge period DW and is shorter than the total time period of the lengths of each of the first waste liquid discharge period D41, the second waste liquid discharge period D42, and the third waste liquid discharge period D43.

In the present embodiment, start points of the first waste liquid discharge period D41, the second waste liquid discharge period D42, and the third waste liquid discharge period D43 are matched with each other at the time point T22. Furthermore, the start point of each of the second supply period D32 and the third supply period D33 (the time point T16) is later than the start point of the first supply period D31 (the time point T15). Thus, a length of time from the start point of each of the second supply period D32 and the third supply period D33 (the time point T16) to the start point of each of the second waste liquid discharge period D42 and the third waste liquid discharge period D43 (the time point T22) is shorter than a length of time from the start point of the first supply period D31 (the time point T15) to the start point of the first waste liquid discharge period D41 (the time point T22).

At the time point T23, the CPU 81 closes all of the valves, for example. At the time point T23, the CPU 81 may maintain the state of all of the valves, may close some of the valves, or may open some or all of the valves.

As shown in FIG. 5, the CPU 81 performs the uncapping operation (S21). In the processing at S21, the CPU 81 controls the cap motor 48 shown in FIG. 4, and lowers the support plate 47 shown in FIG. 1. In this way, the plurality of caps 41 to 46 are in the uncapped state (refer to FIG. 2).

The CPU 81 performs the wiping operation with respect to the plurality of heads 31 to 33 (S22). At the start of the processing at S22, the plurality of heads 31 to 33 are respectively positioned further to the left than the plurality of wipers 51 to 53. In the processing at S22, the CPU 81 controls the wiper motor 76 shown in FIG. 4, and moves the wipers 51 to 53 shown in FIG. 2 to the protruding position. In this state, the CPU 81 controls the main scanning motor 99 shown in FIG. 4, and moves the carriage 6 shown in FIG. 2 to the right. In this way, when the nozzle surfaces 311, 321, and 331 shown in FIG. 3 pass the respective positions of the wipers 51 to 53 shown in FIG. 2 from the left to the right, the wipers 51 to 53 shown in FIG. 2 respectively wipe the waste liquid from the nozzle surfaces 311, 321, and 331 shown in FIG. 3.

The CPU 81 performs the flushing operation by the plurality of heads 31 to 33 (S23). At the start of the processing at S23, the plurality of heads 31 to 33 are respectively positioned further to the left than the plurality of flushing boxes 61 to 63. In the processing at S23, continuing from the processing at S22, the CPU 81 controls the main scanning motor 99 shown in FIG. 4, and moves the carriage 6 shown in FIG. 2 further to the right. At a timing at which the nozzle surfaces 311, 321, and 331 shown in FIG. 3 pass above the respective flushing boxes 61 to 63 shown in FIG. 2 from the left to the right, the CPU 81 controls the head driver 30 shown in FIG. 4, and ejects the ink from the plurality of heads 31 to 33 shown in FIG. 2.

The CPU 81 performs the wiping operation with respect to the plurality of heads 34 to 36 (S24). At the start of the processing at S24, the plurality of heads 34 to 36 are respectively positioned further to the left than the plurality of wipers 54 to 56. In the processing at S24, continuing from the processing at S23, the CPU 81 controls the wiper motor 77 shown in FIG. 4, and moves the wipers 54 to 56 shown in FIG. 2 to the protruding position. In this state, the CPU 81 controls the main scanning motor 99 shown in FIG. 4, and moves the carriage 6 shown in FIG. 2 further to the right. In this way, when the nozzle surfaces 341, 351, and 361 shown in FIG. 3 pass the respective positions of the wipers 54 to 56 shown in FIG. 2 from the left to the right, the wipers 54 to 56 shown in FIG. 2 respectively wipe the waste liquid from the nozzle surfaces 341, 351, and 361 shown in FIG. 3.

The CPU 81 performs the flushing operation by the plurality of heads 34 to 36 (S25). At the start of the processing at S25, the plurality of heads 34 to 36 are respectively positioned further to the left than the plurality of flushing boxes 61 to 63. In the processing at S25, continuing from the processing at S24, the CPU 81 controls the main scanning motor 99 shown in FIG. 4, and moves the carriage 6 shown in FIG. 2 further to the right. At a timing at which the nozzle surfaces 341, 351, and 361 shown in FIG. 3 pass above the respective flushing boxes 61 to 63 shown in FIG. 2 from the left to the right, the CPU 81 controls the head driver 30 shown in FIG. 4, and ejects the ink from the plurality of heads 34 to 36 shown in FIG. 2.

The CPU 81 performs the capping operation in the same manner as the processing at S11 (S26). In this way, the plurality of caps 41 to 46 are in the capped state. The CPU 81 ends the main processing. Subsequently, when there is the print command, for example, the CPU 81 controls the print operation subsequent to performing the uncapping operation.

Main effects of the above-described embodiment will be described. Hereinafter, mainly the effects relating to the flow paths via the cleaning liquid tank 40, the waste liquid tank 49, and the cap 41, and relating to the flow paths via the cleaning liquid tank 40, the waste liquid tank 49, and the cap 43 will be explained as examples. The printer 1 also achieves the same effects relating to the flow paths via the caps 42, 44, and 45, or 46.

If, for example, the first pump 214 is driven in the state in which the second pump 234 is being driven, the flow path resistance in the flow path 101 becomes larger. When the flow path resistance in the flow path 101 becomes larger, there is the possibility that the supply amount from the cleaning liquid tank 40 to the cap 41 may decrease. In the present embodiment, the first supply period D31 includes the first specific supply period DA1. In this case, in the first supply processing, during the first specific supply period DA1, the first pump 214 is driven in the state in which the second pump 234 is stopped. Thus, during the first specific supply period DA1, the supply amount of the cleaning liquid from the cleaning liquid tank 40 to the cap 41 is increased, compared to a case in which the first pump 214 is driven in the state in which the second pump 234 is being driven. As a result, the printer 1 contributes to preventing insufficient cleaning of the nozzle surface 311 or the cap 41.

Furthermore, when the supply amount of the cleaning liquid from the cleaning liquid tank 40 to the cap 41 decreases, in order to recoup the amount by which the supply amount of the cleaning liquid has decreased, for example, it is conceivable to lengthen a drive time of the first pump 214, or strengthen a suction force of the first pump 214. In this case, there is a possibility that the time period required for the first supply processing will become longer, or that the white ink will be unintentionally sucked from the head 31 when supplying the cleaning liquid. Thus, there is the possibility that the time period required for the first supply processing will become longer, or that the amount of the white ink consumed by the first supply processing will increase. In the above-described embodiment, the supply amount of the cleaning liquid from the cleaning liquid tank 40 to the cap 41 is suppressed from decreasing, and thus, there is no need to increase the drive time period of the first pump 214, or strengthen the suction force of the first pump

214. Thus, the printer 1 contributes to suppressing the possibility of a lengthening of the time period required for the first supply processing, or an increase in the amount of white ink consumed by the first supply processing.

The start point of the second supply period D32 (the time point T16) is later than the start point of the first supply period D31 (the time point T15). In this case, the first specific supply period DA1 starts from the start point of the first supply period D31 (the time point T15). Thus, in the first supply processing, the driving of the first pump 214 is started in the state in which the second pump 234 is stopped. As a result, during the period from the start point of the first supply period D31 (the time point T15) to the start point of the second supply period D32 (the time point T16), the supply amount of the cleaning liquid from the cleaning liquid tank 40 to the cap 41 is increased, compared to a case in which the driving of the first pump 214 is started in the state in which the second pump 234 is being driven or at the same time as the start of the driving of the second pump 234. Thus, the printer 1 contributes to further preventing insufficient cleaning of the nozzle surface 311.

If, for example, the first suction period D11 and the second suction period D12 are completely offset from each other, there is the possibility that the time period required for the ink suction processing will become longer. In the above-described embodiment, the first suction period D11 and the second suction period D12 include the overlapping suction period DS. Thus, the printer 1 contributes to shortening the time period required for the ink suction processing, compared to a case in which the first suction period D11 and the second suction period D12 are completely offset from each other.

Furthermore, if, for example, the ink suction processing is performed subsequent to the cleaning liquid supply processing, there is a possibility that the cleaning liquid of the cap space 411 is also sucked along with the ink by the ink suction processing, and that, subsequent to the ink suction processing, a state is obtained in which the cap space 411 is not filled with the cleaning liquid. In the above-described embodiment, the ink suction processing is performed earlier than the cleaning liquid supply processing. Thus, the printer 1 contributes to preventing the insufficient cleaning of the nozzle surface 311 by the ink suction processing.

If, for example, the third supply period D33 is completely offset from the first supply period D31 and the second supply period D32, there is a possibility that the time period required for the cleaning liquid supply processing may become longer. In the above-described embodiment, the third supply period D33 includes the overlapping supply period DD. Thus, the printer 1 contributes to shortening the time period required for the cleaning liquid supply processing, compared to a case in which the third supply period D33 is completely offset from the first supply period D31 and the second supply period D32.

If, for example, the first waste liquid discharge period D41 and the second waste liquid discharge period D42 are completely offset from each other, there is a possibility that the time period required for the waste liquid discharge processing may become longer. In the above-described embodiment, the first waste liquid discharge period D41 and the second waste liquid discharge period D42 include the overlapping waste liquid discharge period DW. Thus, the printer 1 contributes to shortening the time period required for the waste liquid discharge processing, compared to a case in which the first waste liquid discharge period D41 and the second waste liquid discharge period D42 are completely offset from each other.

Inside the cap 43, if the time period is long over which the cleaning liquid is in contact with the nozzle surface 331 due to the cleaning liquid supply processing, there is a possibility that another color of the color inks may enter into the nozzles 332 for discharging the color inks of one color, and that a color mixing defect of the color inks may occur. On the other hand, in the cap 41, even if the time period is long over which the cleaning liquid is in contact with the nozzle surface 311 due to the cleaning liquid supply processing, since only the nozzles 312 for ejecting the white ink are provided in the nozzle surface 311, the possibility of a defect occurring due to color mixing of the white ink is low. In the above-described embodiment, the length of time from the start point of the second supply period D32 (the time point T16) to the start point of the second waste liquid discharge period D42 (the time point T22) is shorter than the length of time from the start point of the first supply period D31 (the time point T15) to the start point of the first waste liquid discharge period D41 (the time point T22). Thus, the time period over which the cleaning liquid is in contact with the nozzle surface 331 inside the cap 43 is shorter than the time period over which the cleaning liquid is in contact with the nozzle surface 311 inside the cap 41. As a result, the printer 1 contributes to suppressing a defect caused by the color mixing of the color inks.

The CPU 81 alternately repeats the first supply processing and the first stop processing. The CPU 81 alternately repeats the second supply processing and the second stop processing. Thus, the negative pressure generated inside the cap 41 by the first supply processing falls as a result of the first stop processing. Thus, in the first supply processing, the printer 1 contributes to suppressing the white ink from being sucked from the nozzles 312. The negative pressure generated inside the cap 43 by the second supply processing falls as a result of the second stop processing. Thus, in the second supply processing, the printer 1 contributes to suppressing the color ink from being sucked from the nozzles 322.

If, for example, the second supply processing is performed a predetermined number of times after a predetermined number of times of the first supply processing is complete, there is a possibility that a time period from the start of the initial first supply processing to the end of the last second supply processing may become long. In the above-described embodiment, the first stop period D51 in the N-th first stop processing includes the first overlapping stop period DB1 in the N-th second supply processing, and the second stop period D52 in the N-th second stop processing includes the second overlapping stop period DB2 in the N+1-th first supply processing. Thus, the printer 1 contributes to shortening the time period from the start of the one time of the first supply processing to the end of the last second supply processing. Furthermore, compared to a case in which the cap space 431 is filled with the cleaning liquid by the initial second supply processing, the time period over which the cleaning liquid is in contact with the nozzle surface 331 inside the cap 43 is suppressed from becoming long. Thus, the printer 1 contributes to suppressing a defect caused by the color mixing of the color inks.

If, for example, the first upstream valve 412 or the first downstream valve 414 is switched from the open state to the closed state in the second supply period D32, there is a possibility that the white ink inside the nozzles 312 may go back into the head 31 as a result of a shock caused by the first upstream valve 412 or the first downstream valve 414 being switched from the open state to the closed state. In the above-described embodiment, the second supply period D32 includes the open period DP. Thus, in the open period DP, the white ink inside the nozzles 312 is suppressed from going back into the head 31 as a result of a shock caused by the first upstream valve 412 or the first downstream valve 414 being switched from the open state to the closed state. Thus, the printer 1 contributes to suppressing an ejection failure of the white ink in the nozzles 312.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. For example, a correlation in the degrees of viscosity of each of the cleaning liquid, the white ink, the color ink, and the special ink is not limited to that of the above-described embodiment. In the above-described embodiment, the printer 1 performs the print operation using a serial head method. In contrast to this, the printer 1 may perform the print operation using a line head method.

It is sufficient that the printer 1 be provided with at least two of the nozzle surfaces 311, 321, 331, 341, 351, and 361. Thus, the printer 1 may be further provided with another head in addition to the plurality of heads 31 to 36. The printer 1 may omit some of the plurality of heads 31 to 36. For example, the printer 1 may omit the plurality of heads 34 to 36, or may omit the plurality of heads 32 and 35. The printer 1 may be provided with a single head. In this case, the at least two of the nozzle surfaces 311, 321, 331, 341, 351, and 361, such as the nozzle surface 311, the nozzle surface 321, and the nozzle surface 331, may be provided in the lower surface of the single head.

The plurality of heads 31 to 36 may all eject the ink of the same color (the white ink, for example). The plurality of heads 31 to 36 may eject a pre-treatment agent, a post-treatment agent, a discharge agent, or the like. A number of each of the nozzles 312, 322, 332, 342, 352, and 362 may be one.

It is sufficient that the printer 1 be provided with at least two of the caps 41 to 46. For example, when the plurality of heads 34 to 36 are omitted, the printer 1 may omit the caps 44 to 46. The printer 1 may change the flow paths between the cleaning liquid tank 40 and the waste liquid tank 49 as appropriate in accordance with the number of the caps 41 to 46. For example, when the cap 44 is omitted, the printer 1 may omit the flow paths 113 and 115.

The printer 1 may switch the caps 41 to 46 between the capped state and the uncapped state using a different method to that of the above-described embodiment. For example, the printer 1 may switch the caps 41 to 46 between the capped state and the uncapped state by raising and lowering the heads 31 to 36.

A modified example of the flow paths between the cleaning liquid tank 40 and the waste liquid tank 49 via the cap 41 will be described. Note that the flow paths between the cleaning liquid tank 40 and the waste liquid tank 49 via the caps 42 to 46 may be changed in a similar manner.

For example, the flow path 181 need not necessarily be connected to the waste liquid tank 49. The printer 1 may omit the flow paths 114, 171, and 181. The first downstream valve 414 and the first pump 214 may be arranged in the order of the first pump 214 and the first downstream valve 414 from the point P14 toward the point P17. The first pump 214 may be provided in the flow path 112, the flow path 111, or the flow path 171. When the first pump 214 is provided in the flow path 112, for example, the first pump 214 and the first upstream valve 412 may be arranged in the order of the first pump 214 and the first upstream valve 412, or in the order of the first upstream valve 412 and the first pump 214, from the point P12 toward the point P13. When the first pump is provided in the flow path 111 or the flow path 171, for example, the printer 1 may omit the first pump 215.

The printer 1 may omit one or both of the first upstream valve 412 or the first downstream valve 414. The first downstream valve 414 may be provided in the flow path 171. The first upstream valve 412 may be provided in the flow path 111.

The printer 1 may omit some of the flow paths 191, 192, or 193. When the printer 1 omits the flow paths 192 and 193, for example, the flow path 191 is preferably connected between the cleaning liquid valve 401 and the point P11 in the flow path 101. The printer 1 may omit all of the flow paths 191, 192, and 193. In this case, for example, in the waste liquid discharge processing, in the processing at S151, the CPU 81 may perform the uncapping operation before driving the first pumps 214 and 215, the second pumps 234 and 235, and the third pumps 264 and 265. In this way, since the driving is performed in the uncapped state, a state is obtained in which the outside air 100 is supplied to the cap space 411, for example. When the printer 1 omits all of the flow paths 191, 192, and 193, the printer 1 may also omit the cleaning liquid valve 401.

In the cleaning liquid supply processing, the whole of the first supply period D31, the whole of the second supply period D32, and the whole of the third supply period D33 need not necessarily be matched with each other. Thus, for example, the relationship between the first supply period D31 and the second supply period D32 may be changed from the above-described embodiment. FIG. 9 to FIG. 12 show modified examples of the relationship between the first supply period D31 and the second supply period D32 from the time point T15 to the time point T16. In FIG. 9 to FIG. 12, the relationship between the opening and closing timings of each of the second upstream valves 432 and 433 and the second downstream valves 434 and 435, and the timings of driving and stopping the second pumps 234 and 235 is the same as in the above-described embodiment. Note that the relationship between the first supply period D31 and the third supply period D33 may also be changed in a similar manner to the relationship between the first supply period D31 and the second supply period D32.

Figure 9:
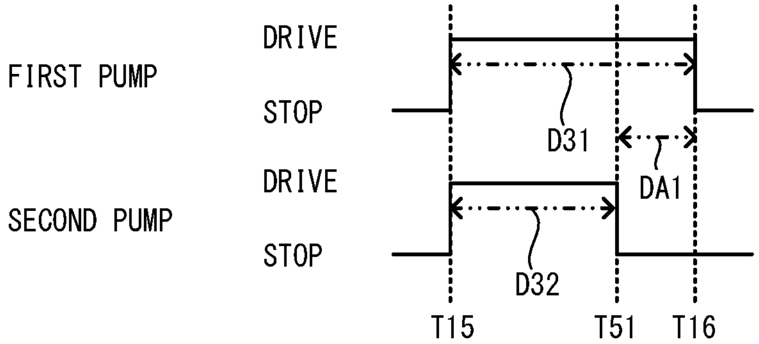
FIG. 9 is a timing chart showing a relationship between the driving and stopping of a first pump and the driving and stopping of a second pump.

As shown in FIG. 9, the start point of the second supply period D32 may match the start point of the first supply period D31 at the time point T15. The length of the second supply period D32 may be shorter than the length of the first supply period D31. For example, the end point of the second supply period D32 is a time point T51, and is earlier than the end point of the first supply period D31 (the time point T16). In this case, the first specific supply period DA1 is a period from the time point T51 to the time point T16. The second specific supply period DA2 is not present.

Figure 10:
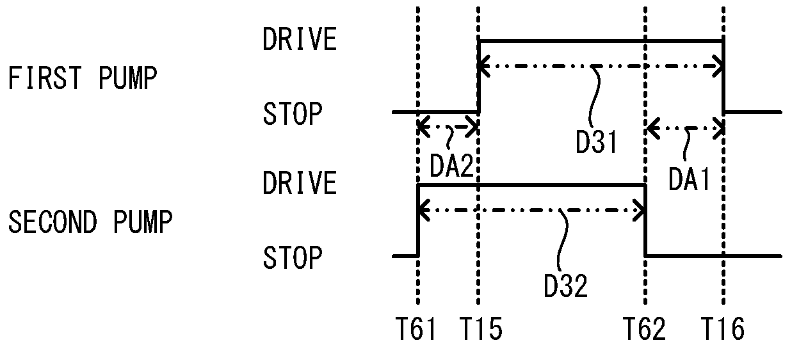
FIG. 10 is a timing chart showing a relationship between the driving and stopping of the first pump and the driving and stopping of the second pump.

As shown in FIG. 10, the start point of the second supply period D32 may be a time point T61, and may be earlier than the start point of the first supply period D31 (the time point T15). The end point of the second supply period D32 may be a time point T62, and may be earlier than the end point of the first supply period D31 (the time point T16). In this case, the first specific supply period DA1 is a period from the time point T62 to the time point T16. The second specific supply period DA2 is a period from the time point T61 to the time point T15.

Figure 11:
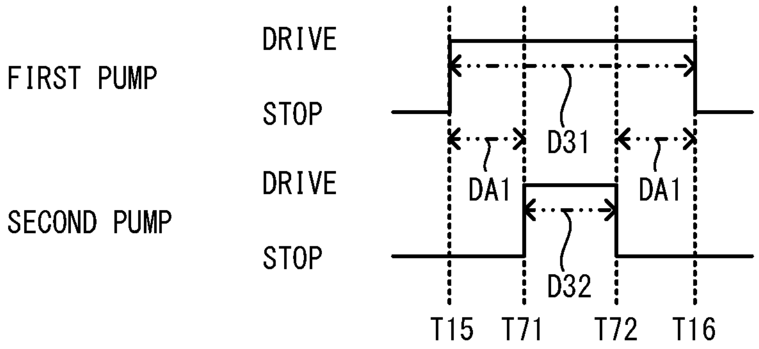
FIG. 11 is a timing chart showing a relationship between the driving and stopping of the first pump and the driving and stopping of the second pump.

As shown in FIG. 11, the start point of the second supply period D32 may be a time point T71, and may be later than the start point of the first supply period D31 (the time point T15). The end point of the second supply period D32 may be a time point T72, and may be earlier than the end point of the first supply period D31 (the time point T16). In this case, the first specific supply period DA1 is a period from the time point T15 to the time point T71, and a period from the time point T72 to the time point T16. The second specific supply period DA2 is not present.

Figure 12:
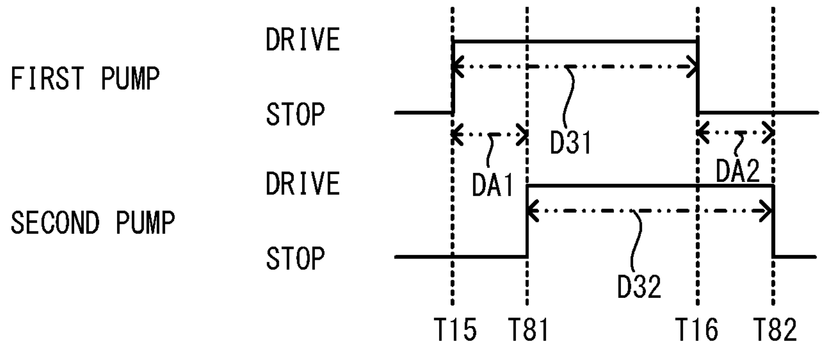
FIG. 12 is a timing chart showing a relationship between the driving and stopping of the first pump and the driving and stopping of the second pump.

As shown in FIG. 12, the start point of the second supply period D32 may be a time point T81, and may be later than the start point of the first supply period D31 (the time point T15). The end point of the second supply period D32 may be a time point T82, and may be later than the end point of the first supply period D31 (the time point T16). In this case, the first specific supply period DA1 is a period from the time point T15 to the time point T81. The second specific supply period DA2 is a period from the time point T16 to the time point T82.

Figure 13:
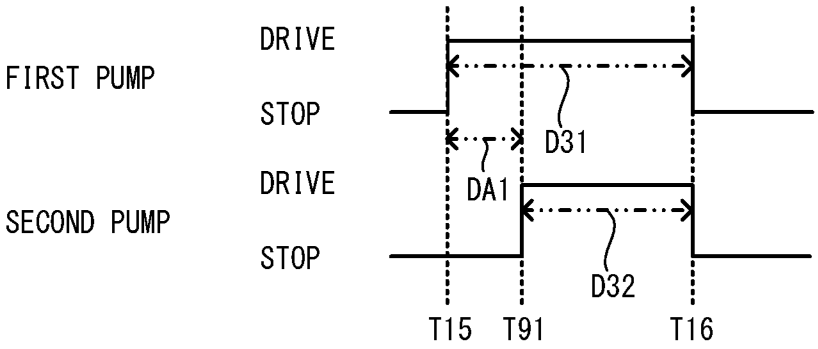
FIG. 13 is a timing chart showing a relationship between the driving and stopping of the first pump and the driving and stopping of the second pump.

As shown in FIG. 13, the start point of the second supply period D32 may be a time point T91, and may be later than the start point of the first supply period D31 (the time point T15). The end point of the second supply period D32 may match the end point of the first supply period D31 at the time point T16. In this case, the first specific supply period DA1 is a period from the time point T15 to the time point T91. The second specific supply period DA2 is not present.

The relationship between the second supply period D32 and the third supply period D33 may also be changed from the above-described embodiment. The second supply period D32 and the third supply period D33 need not necessarily match each other. For example, a part of the third supply period D33 may overlap with the second supply period D32, and may be the overlapping supply period DD. The whole of the third supply period D33 need not necessarily overlap with the second supply period D32. In this case, in the cleaning liquid supply processing, the CPU 81 may perform the third supply processing in continuation from the end of the second supply processing, in a similar manner to performing the second supply processing in continuation from the end of the first supply processing.

In the above-described embodiment, in the processing at S143, for example, the CPU 81 drives each of the first pump 214 and the first pump 215 during the first supply period D31, that is, drives the first pump 214 and the first pump 215 simultaneously during the same time period. In contrast to this, the CPU 81 may drive the first pump 214 and the first pump 215 at different timings from each other, and during different time periods. The CPU 81 may also change the control of the second pumps 234 and 235 and the third pumps 264 and 265 in a similar manner. For example, in the cleaning liquid supply processing, the CPU 81 may sequentially drive the respective six pumps in the order of the first pump 214, the first pump 215, the second pump 234, the second pump 235, the third pump 264, and the third pump 265 such that the drive periods thereof do not overlap with each other. In this case, the printer 1 contributes to preventing insufficient cleaning of all of the nozzle surfaces 311, 321, 331, 341, 351, and 361.

In the cleaning liquid supply processing, the CPU 81 alternately repeats the first supply processing and the first stop processing for the predetermined number of times (three times). In contrast to this, in the cleaning liquid supply processing, the CPU 81 may perform the first supply processing one time only. In this case, the cap spaces 411 and 441 may be filled by the first supply processing performed the one time. In a similar manner, in the cleaning liquid supply processing, the CPU 81 may perform the second supply processing and the third supply processing one time only.

In the above-described embodiment, the CPU 81 performs the N-th second supply processing and third supply processing subsequent to the end of the N-th first supply processing, and repeatedly performs the first supply processing and the second supply processing. In contrast to this, for example, the N-th second supply processing and third supply processing may be repeatedly performed after the end of the N-th first supply processing that has been repeatedly performed.

The end point of the second supply period D32 may match the end point of the first supply period D31, or may be earlier than the end point of the first supply period D31. A part of the second supply period D32 may be the open period DP, or the second supply period D32 need not necessarily include the open period DP. In this case, for example, in the processing at S144 (the time point T16), the CPU 81 may close one or both of the first upstream valves 412 or 413. For example, in the processing at S144 (the time point T16), the CPU 81 may close one or both of the first downstream valves 414 or 415. When the first upstream valve 412 and the first downstream valve 414 are closed, for example, a pressure in the cap space 411 is suppressed from changing as a result of the driving of the second pumps 234 and 235, or the third pumps 264 and 265 in the processing at S145.

A part of the second supply period D32 may be the second specific supply period DA2. In other words, the second supply period D32 may include a period that overlaps with both the first supply period D31 and the third supply period D33. The second supply period D32 need not necessarily include the second specific supply period DA2. The first stop period D51 in the N-th first stop processing need not necessarily include the first overlapping stop period DB1 in the N-th second supply processing. A part of the first stop period D51 in the N-th first stop processing may be the first overlapping stop period DB1 in the N-th second supply processing. The second stop period D52 in the N-th second stop processing need not necessarily include the second overlapping stop period DB2 in the N+1-th first supply processing. A part of the second stop period D52 in the N-th second stop processing may be the second overlapping stop period DB2 in the N+1-th first supply processing. The third supply period D33 and the third stop period D53 may each be changed in a similar manner to the second supply period D32 and the second stop period D52.

In the ink suction processing, a part of the first suction period D11, a part of the second suction period D12, and a part of the third suction period D13 may be the overlapping suction period DS. For example, the start points of each of the first suction period D11, the second suction period D12, and the third suction period D13 may be offset from each other. The end points of each of the first suction period D11, the second suction period D12, and the third suction period D13 may be offset from each other. For example, a part of the first suction period D11 may overlap with the second suction period D12. For example, the whole of the first suction period D11 need not necessarily overlap with the whole of the second suction period D12, the whole of the second suction period D12 need not necessarily overlap with the whole of the third suction period D13, and the whole of the third suction period D13 need not necessarily overlap with the whole of the first suction period D11.

In the waste liquid discharge processing, a part of the first waste liquid discharge period D41, a part of the second waste liquid discharge period D42, and a part of the third waste liquid discharge period D43 may be the overlapping waste liquid discharge period DW. For example, the start points of each of the first waste liquid discharge period D41, the second waste liquid discharge period D42, and the third waste liquid discharge period D43 may be offset from each other. The end points of each of the first waste liquid discharge period D41, the second waste liquid discharge period D42, and the third waste liquid discharge period D43 may be offset from each other. For example, a part of the first waste liquid discharge period D41 may overlap with the second waste liquid discharge period D42. For example, the whole of the first waste liquid discharge period D41 need not necessarily overlap with the whole of the second waste liquid discharge period D42, the whole of the second waste liquid discharge period D42 need not necessarily overlap with the whole of the third waste liquid discharge period D43, and the whole of the third waste liquid discharge period D43 need not necessarily overlap with the whole of the first waste liquid discharge period D41.

In the ink discharge processing, a part of the first ink discharge period D21, a part of the second ink discharge period D22, and a part of the third ink discharge period D23 may be the overlapping ink discharge period DK. For example, the start points of each of the first ink discharge period D21, the second ink discharge period D22, and the third ink discharge period D23 may be offset from each other. The end points of each of the first ink discharge period D21, the second ink discharge period D22, and the third ink discharge period D23 may be offset from each other. For example, a part of the first ink discharge period D21 may overlap with the second ink discharge period D22. The whole of the first ink discharge period D21 need not necessarily overlap with the whole of the second ink discharge period D22, the whole of the second ink discharge period D22 need not necessarily overlap with the whole of the third ink discharge period D23, and the whole of the third ink discharge period D23 need not necessarily overlap with the first ink discharge period D21.

The length of time from the start point of the second supply period D32 (the time point T16) to the start point of the second waste liquid discharge period D42 (the time point T22) may be the same as the length of time from the start point of the first supply period D31 (the time point T15) to the start point of the first waste liquid discharge period D41 (the time point T22), or may be longer than the length from the start point of the first supply period D31 (the time point T15) to the start point of the first waste liquid discharge period D41 (the time point T22).

In the above-described embodiment, the CPU 81 may change a processing order or may omit each of the processing in the main processing, as appropriate. For example, the CPU 81 may omit the ink discharge processing, and may perform the ink suction processing between the cleaning liquid supply processing and the waste liquid discharge processing. The CPU 81 may perform the ink suction processing and the ink discharge processing between the waste liquid discharge processing (S41) and the uncapping operation (S21). The CPU 81 may omit the processing subsequent to the uncapping operation (S21). For example, the CPU 81 may control the print operation after performing the uncapping operation by the processing at S21.

In the processing at S142 (the time point T15), for example, the CPU 81 need not necessarily close the second upstream valves 432 and 433, the second downstream valves 434 and 435, the third upstream valves 462 and 463, and the third downstream valves 464 and 465. In this case, the CPU 81 may omit the processing at S144.

In place of the CPU 81, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 82, the flash memory 84, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 82 or the flash memory 84. In this case, the control program may be stored in a non-transitory storage medium, such as an HDD provided in the server.

What is claimed is:

1. A printer comprising:

a first nozzle surface provided with a first nozzle configured to eject a first ink;

a second nozzle surface provided with a second nozzle configured to eject a second ink;

a first cap configured to cover the first nozzle and closely adhere to the first nozzle surface;

a second cap configured to cover the second nozzle and closely adhere to the second nozzle surface;

a cleaning liquid tank configured to store a cleaning liquid;

a connecting flow path connected to the cleaning liquid tank;

a first branched flow path connecting the connecting flow path and the first cap to each other;

a second branched flow path connecting the connecting flow path and the second cap to each other;

a first pump provided in a first flow path connected to the first cap;

a second pump provided in a second flow path connected to the second cap;

a processor; and a memory storing computer-readable instructions that, when executed by the processor, cause the processor to perform processes comprising:

first supply processing of supplying the cleaning liquid from the cleaning liquid tank to the first cap via the connecting flow path and the first branched flow path, by driving the first pump during a first supply period in a state of the first cap being closely adhered to the first nozzle surface; and second supply processing of supplying the cleaning liquid from the cleaning liquid tank to the second cap via the connecting flow path and the second branched flow path, by driving the second pump during a second supply period in a state of the second cap being closely adhered to the second nozzle surface, wherein the first supply period includes a first specific supply period that does not overlap with the second supply period.

2. The printer according to claim 1, wherein a second supply start point of the second supply period is later than a first supply start point of the first supply period.

3. The printer according to claim 1, further comprising:

a first valve provided in the first branched flow path; and a second valve provided in the second branched flow path, wherein the computer-readable instructions instruct the processor to perform processes further comprising:

first suction processing of sucking the first ink from the first nozzle, by driving the first pump during a first suction period in a state of the first cap being closely adhered to the first nozzle surface and the first valve being closed; and second suction processing of sucking the second ink from the second nozzle, by driving the second pump during a second suction period in a state of the second cap being closely adhered to the second nozzle surface and the second valve being closed, and the first suction period and the second suction period include an overlapping suction period in which the first suction period and the second suction period overlap with each other.

4. The printer according to claim 1, further comprising:

a third nozzle surface provided with a third nozzle configured to eject a third ink;

a third cap configured to closely adhere to the third nozzle surface;

a third pump provided in a third flow path connected to the third cap; and a third branched flow path connecting the connecting flow path and the third cap to each other, wherein the computer-readable instructions instruct the processor to perform a process further comprising:

third supply processing of supplying the cleaning liquid from the cleaning liquid tank to the third cap via the connecting flow path and the third branched flow path, by driving the third pump during a third supply period in a state of the third cap being closely adhered to the third nozzle surface, and the third supply period includes an overlapping supply period overlapping with at least one of the first supply period or the second supply period.

5. The printer according to claim 1, further comprising:

a first waste liquid flow path connected to the first cap and being different from the first branched flow path; and a second waste liquid flow path connected to the second cap and being different from the second branched flow path, wherein the computer-readable instructions instruct the processor to perform processes further comprising:

first discharge processing of, subsequent to the first supply processing, discharging the cleaning liquid from the first cap via the first waste liquid flow path, by driving the first pump during a first discharge period in a state of outside air being supplied to the first cap; and second discharge processing of, subsequent to the second supply processing, discharging the cleaning liquid from the second cap via the second waste liquid flow path, by driving the second pump during a second discharge period in a state of the outside air being supplied to the second cap, and the first discharge period and the second discharge period include an overlapping discharge period in which the first discharge period and the second discharge period overlap with each other.

6. The printer according to claim 5, wherein the first nozzle surface is provided with the first nozzle configured to eject the first ink of a single color, the second nozzle surface is provided with a plurality of the second nozzles, the plurality of second nozzles include a first color nozzle configured to eject the second ink of a first color, and a second color nozzle configured to eject the second ink of a second color different from the first color, and a length of time from a second supply start point of the second supply period to a second discharge start point of the second discharge period is shorter than a length of time from a first supply start point of the first supply period to a first discharge start point of the first discharge period.

7. The printer according to claim 1, wherein the computer-readable instructions instruct the processor to perform processes comprising:

alternately repeating the first supply processing, and first stop processing of stopping the first pump during a first stop period; and alternately repeating the second supply processing, and second stop processing of stopping the second pump during a second stop period.

8. The printer according to claim 7, wherein the second supply period includes a second specific supply period not overlapping with the first supply period, the first stop period in the first stop processing of an N-th time includes a first overlapping stop period overlapping with the second specific supply period in the second supply processing of an N-th time, and the second stop period in the second stop processing of an N-th time includes a second overlapping stop period overlapping with the first specific supply period in the first supply processing of an N+1-th time.

9. The printer according to claim 1, further comprising:

a first valve provided in the first flow path; and a second valve provided in the second flow path, wherein a second supply end point of the second supply period is later than a first supply end point of the first supply period, the computer-readable instructions instruct the processor to perform processes further comprising:

in the first supply processing, driving the first pump during the first supply period in a state of the first cap being closely adhered to the first nozzle surface and the first valve being open; and in the second supply processing, driving the second pump during the second supply period in a state of the second cap being closely adhered to the second nozzle surface and the second valve being open, and the second supply period includes an open period of the first valve being open.

10. A control method controlling a printer including a first nozzle surface, a second nozzle surface, a first cap, a second cap, a cleaning liquid tank, a connecting flow path, a first branched flow path, a second branched flow path, a first pump, and a second pump, the first nozzle surface being provided with a first nozzle configured to eject a first ink, the second nozzle surface provided with a second nozzle configured to eject a second ink, the first cap being configured to cover the first nozzle and closely adhere to the first nozzle surface, the second cap being configured to cover the second nozzle and closely adhere to the second nozzle surface, the cleaning liquid tank being configured to store a cleaning liquid, the connecting flow path connected to the cleaning liquid tank, the first branched flow path connecting the connecting flow path and the first cap to each other, the second branched flow path connecting the connecting flow path and the second cap to each other, the first pump provided in a first flow path connected to the first cap, the second pump provided in a second flow path connected to the second cap, the control method comprising:

first supply processing of supplying the cleaning liquid from the cleaning liquid tank to the first cap via the connecting flow path and the first branched flow path, by driving the first pump during a first supply period in a state of the first cap being closely adhered to the first nozzle surface; and second supply processing of supplying the cleaning liquid from the cleaning liquid tank to the second cap via the connecting flow path and the second branched flow path, by driving the second pump during a second supply period in a state of the second cap being closely adhered to the second nozzle surface, wherein the first supply period includes a first specific supply period that does not overlap with the second supply period.

11. A non-transitory computer-readable medium storing computer-readable instructions executed by a computer controlling a printer including a first nozzle surface, a second nozzle surface, a first cap, a second cap, a cleaning liquid tank, a connecting flow path, a first branched flow path, a second branched flow path, a first pump, and a second pump, the first nozzle surface being provided with a first nozzle configured to eject a first ink, the second nozzle surface provided with a second nozzle configured to eject a second ink, the first cap being configured to cover the first nozzle and closely adhere to the first nozzle surface, the second cap being configured to cover the second nozzle and closely adhere to the second nozzle surface, the cleaning liquid tank being configured to store a cleaning liquid, the connecting flow path connected to the cleaning liquid tank, the first branched flow path connecting the connecting flow path and the first cap to each other, the second branched flow path connecting the connecting flow path and the second cap to each other, the first pump provided in a first flow path connected to the first cap, the second pump provided in a second flow path connected to the second cap, the instructions, when executed by the computer, causing the computer to perform processes comprising:

first supply processing of supplying the cleaning liquid from the cleaning liquid tank to the first cap via the connecting flow path and the first branched flow path, by driving the first pump during a first supply period in a state of the first cap being closely adhered to the first nozzle surface; and second supply processing of supplying the cleaning liquid from the cleaning liquid tank to the second cap via the connecting flow path and the second branched flow path, by driving the second pump during a second supply period in a state of the second cap being closely adhered to the second nozzle surface, wherein the first supply period includes a first specific supply period that does not overlap with the second supply period.

* * * * *